(12) United States Patent
Schwartz et al.

(10) Patent No.: US 11,305,194 B2
(45) Date of Patent: Apr. 19, 2022

(54) SYSTEMS AND METHODS FOR PROVIDING A REAL-TIME REPRESENTATION OF POSITIONAL INFORMATION OF SUBJECTS

(71) Applicant: Tempus Ex Machina, Inc., San Francisco, CA (US)

(72) Inventors: Erik Schwartz, Los Altos Hills, CA (US); Michael Naquin, Alamo, CA (US); Christopher Brown, Atlanta, GA (US); Steve Xing, San Francisco, CA (US); Pawel Czarnecki, San Francisco, CA (US); Charles D. Ebersol, Los Angeles, CA (US)

(73) Assignee: Tempus Ex Machina, Inc., San Francisco, CA (US)

( * ) Notice: Subject to any disclaimer, the term of this patent is extended or adjusted under 35 U.S.C. 154(b) by 0 days.

(21) Appl. No.: 16/747,437

(22) Filed: Jan. 20, 2020

(65) Prior Publication Data

US 2020/0230502 A1 Jul. 23, 2020

Related U.S. Application Data

(60) Provisional application No. 62/795,016, filed on Jan. 21, 2019, provisional application No. 62/802,185, filed on Feb. 6, 2019.

(51) Int. Cl.
*G08B 1/08* (2006.01)
*A63F 13/65* (2014.01)

(52) U.S. Cl.
CPC .................................. *A63F 13/65* (2014.09)

(58) Field of Classification Search
CPC ....................................................... A63F 13/65
See application file for complete search history.

(56) References Cited

U.S. PATENT DOCUMENTS 6,371,855 B1 * 4/2002 Gavriloff ................ A63F 13/12
463/42
9,398,213 B1 * 7/2016 Cronin ............... A63B 71/0605
(Continued)

OTHER PUBLICATIONS

Alasiry et al., Real-time Players Movement Monitoring on Basketball Game using UWB Multidrop Ranging and Trilateration (Year: 2019).*

(Continued)

*Primary Examiner* — Quang Pham
(74) *Attorney, Agent, or Firm* — Van Pelt, Yi & James LLP

(57) ABSTRACT

A process to track and provide positional information for display on a remote device includes receiving, on a first recurring basis, time-stamped position information of participant(s) in a competition. The time-stamped position information is captured by a telemetry tracking system during the competition and describes a time-stamped position of each of one or more corresponding participants in a predetermined spatial region. The process includes communicating at least a subset of time-stamped position information to the remote device on a second recurring basis. The remote device uses the time-stamped position information to overlay a representation of one or more of said participants onto a first virtual reproduction of at least a relevant portion of the predetermined spatial region to produce and display an instance of a compiled virtual scene that shows a respective position of each of the participant(s) on the first virtual reproduction of the predetermined spatial region.

25 Claims, 14 Drawing Sheets

(56) References Cited

U.S. PATENT DOCUMENTS

| | | | |
|---|---|---|---|
| 10,338,091 B2* | 7/2019 | Wackym | A61B 5/6803 |
| 10,412,467 B2* | 9/2019 | Love | H04N 21/2187 |
| 10,478,730 B1* | 11/2019 | Burnett | A63F 13/828 |
| 2010/0041470 A1* | 2/2010 | Preisach | G07F 17/32 463/25 |
| 2010/0184563 A1* | 7/2010 | Molyneux | A43B 1/0054 482/1 |
| 2011/0205022 A1* | 8/2011 | Cavallaro | H04Q 5/22 340/8.1 |
| 2012/0077587 A1* | 3/2012 | Apirian | G07F 17/3276 463/31 |
| 2012/0233105 A1* | 9/2012 | Cavallaro | G01S 5/16 706/46 |
| 2012/0244942 A1* | 9/2012 | Meyer | A63F 13/537 463/32 |
| 2013/0066448 A1* | 3/2013 | Alonso | H04Q 9/00 700/91 |
| 2013/0130843 A1* | 5/2013 | Burroughs | A43B 5/02 473/415 |
| 2013/0204930 A1* | 8/2013 | Hobby | H04L 69/329 709/203 |
| 2013/0217491 A1* | 8/2013 | Hilbert | G07F 17/322 463/31 |
| 2013/0267291 A1* | 10/2013 | Davis | G07F 17/3244 463/13 |
| 2013/0316837 A1* | 11/2013 | Coiner, Jr. | G06F 16/73 463/43 |
| 2014/0094256 A1* | 4/2014 | Hilbert | G07F 17/3211 463/20 |
| 2014/0125806 A1* | 5/2014 | Kemppainen | H04N 5/23203 348/157 |
| 2014/0169758 A1* | 6/2014 | Sapoznikow | G11B 27/10 386/241 |
| 2014/0211090 A1* | 7/2014 | Faratzis | H04N 21/4788 348/563 |
| 2014/0213352 A1* | 7/2014 | Faratzis | A63B 71/0605 463/31 |
| 2014/0274321 A1* | 9/2014 | Ulrich | G07F 17/3272 463/25 |
| 2014/0323201 A1* | 10/2014 | Yamauchi | G07F 17/34 463/20 |
| 2014/0335932 A1* | 11/2014 | Fujisawa | G07F 17/326 463/20 |
| 2014/0349750 A1* | 11/2014 | Thompson | H04N 21/2358 463/31 |
| 2014/0361875 A1* | 12/2014 | O'Hagan | G09B 19/0038 340/8.1 |
| 2015/0018082 A1* | 1/2015 | Kim | G07F 17/3262 463/25 |
| 2015/0148129 A1* | 5/2015 | Austerlade | G07F 17/3234 463/31 |
| 2015/0149837 A1* | 5/2015 | Alonso | G06K 7/10366 714/57 |
| 2015/0206335 A1* | 7/2015 | Hugel | G09G 5/227 345/419 |
| 2015/0258443 A1* | 9/2015 | McAuley | A63F 13/46 463/31 |
| 2015/0352450 A1* | 12/2015 | Burrows | A63F 13/338 463/31 |
| 2015/0375083 A1 | 12/2015 | Stelfox | |
| 2015/0375117 A1* | 12/2015 | Thompson | H04N 21/254 463/9 |
| 2016/0063798 A1* | 3/2016 | Rehill | A63F 1/04 463/22 |
| 2016/0158625 A1* | 6/2016 | DeAngelis | G06K 7/10366 340/539.13 |
| 2016/0247537 A1* | 8/2016 | Ricciardi | G11B 27/036 |
| 2016/0253919 A1* | 9/2016 | Coiner | A63F 13/46 463/31 |
| 2016/0260015 A1 | 9/2016 | Lucey | |
| 2016/0300431 A1* | 10/2016 | Ortiz | G07F 17/3288 |
| 2016/0354633 A1* | 12/2016 | Schauermann | G06Q 10/0639 |
| 2016/0373661 A1* | 12/2016 | Zhang | G01S 3/7864 |
| 2017/0049406 A1* | 2/2017 | Lanzel | A61B 5/743 |
| 2017/0064240 A1* | 3/2017 | Mangat | G06F 16/5866 |
| 2017/0109975 A1* | 4/2017 | Fei | A63F 13/25 |
| 2017/0291093 A1* | 10/2017 | Janssen | A63B 69/345 |
| 2017/0304705 A1* | 10/2017 | Hermandorfer | A63B 69/0013 |
| 2017/0368439 A1* | 12/2017 | Khazanov | A63B 71/0622 |
| 2018/0190077 A1* | 7/2018 | Hall | G07F 17/3288 |
| 2018/0301169 A1* | 10/2018 | Ricciardi | G06F 16/784 |
| 2018/0374222 A1* | 12/2018 | Kobayashi | G06F 3/0304 |
| 2019/0064311 A1* | 2/2019 | Tang | G06K 9/00362 |
| 2019/0068914 A1* | 2/2019 | Casner | G06K 9/00711 |
| 2019/0114485 A1* | 4/2019 | Chan | G11B 27/031 |
| 2019/0147702 A1* | 5/2019 | Malek | G07F 17/3272 463/25 |
| 2019/0147703 A1* | 5/2019 | Malek | G07F 17/3227 463/20 |
| 2019/0166412 A1* | 5/2019 | Panchaksharaiah | G06F 16/447 |
| 2019/0221080 A1* | 7/2019 | Reetz | G06Q 50/34 |
| 2020/0246661 A1* | 8/2020 | Husemeyer | A63B 24/0062 |
| 2021/0146246 A1* | 5/2021 | Ohashi | A63F 13/79 |

OTHER PUBLICATIONS

Foina et al., Player Tracker—a tool to analyze sport players using RFID (Year: 2010).*

Deans et al., Creating symbolic cultures of consumption_ an analysis of the content of sports wagering advertisements in Australia (Year: 2016).*

Gainsbury et al., The Relationship Between In-Play Betting and Gambling Problems in an Australian Context of Prohibited Online In-Play Betting (Year: 2020).*

Gimenez-Egido et al., Using Smart Sensors to Monitor Physical Activity and Technical-Tactical Actions in Junior Tennis Players (Year: 2020).*

Lim et al., Wearable Technologies in Field Hockey Competitions A Scoping Review (Year: 2021).*

Robert Aughey, Applications of GPS Technologies to Field Sports (Year: 2011).*

Sheng et al., A Novel Changing Athlete Body Real-Time Visual Tracking Algorithm Based on Distractor-Aware SiamRPN and HOG-SVM (Year: 2020).*

* cited by examiner

800

SYSTEMS AND METHODS FOR PROVIDING A REAL-TIME REPRESENTATION OF POSITIONAL INFORMATION OF SUBJECTS

CROSS REFERENCE TO OTHER APPLICATIONS

This application claims priority to U.S. Provisional Patent Application No. 62/795,016, entitled SYSTEMS AND METHODS FOR TRACKING AND WHITE BOARDING POSITIONAL INFORMATION OF SUBJECTS DURING GAME PLAY filed Jan. 21, 2019, and claims priority to U.S. Provisional Patent Application No. 62/802,185, entitled SYSTEMS AND METHODS FOR TRACKING AND WHITE BOARDING POSITIONAL INFORMATION OF SUBJECTS DURING GAME PLAY filed Feb. 6, 2019, both of which are incorporated herein by reference for all purposes.

BACKGROUND OF THE INVENTION

Live sporting events, such as football and soccer, are one of the most popular forms on entertainment. According to the 2016 Nielson National Television (TV) View (NNTV) Program Report, live sporting events accounted for nine of the top 10 single telecast TV programs in the United States and three of the top 10 regularly scheduled TV programs in the United States. However, a spectator watching the live sporting event currently experiences a lag of at least 10 to 60 seconds. This delay includes a period of time for a video feed to be captured, transmitted through a satellite network to a broadcast production facility that adds graphics to the video feed, and transmitted again through a satellite network to one or more distribution servers that communicate the video feed to each remote device. This delay may be upwards of 10 seconds to 60 seconds depending on a distance that the video feed is transmitted as well as a definition of the video feed. Removing or reducing this delay is technically challenging, but there is a need to reduce this delay to improve the viewing experience of remote spectators.

BRIEF SUMMARY

Techniques (including a system, a processor, and a computer program product) for providing a real-time (or near real-time) representation of positional information of subjects are disclosed. The techniques track and whiteboard positional information of subjects during a competition such as a live sport event. Whiteboarding permits several remote devices to display information in real-time or near real-time, and can be used to represent a live sport event, for fantasy sports, among other things.

In various embodiments, a process tracks and provides positional information for display on a remote device. The process receives, on a first recurring basis, time-stamped position information of one or more participants comprising one or both of a first set of participants and a second set of participants in a competition. The time-stamped position information is captured by a telemetry tracking system during the competition and describes a time-stamped position of each of one or more corresponding participants in a predetermined spatial region. The process communicates at least a subset of time-stamped position information to the remote device on a second recurring basis.

In various embodiments, a remote device is configured to use the time-stamped position information (from the system) to overlay a representation of one or more of said participants onto a first virtual reproduction of at least a relevant portion of the predetermined spatial region to produce and display an instance of a compiled virtual scene that details the positional information including a relative position of each of the one or more participants on the first virtual reproduction of the predetermined spatial region.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The techniques disclosed herein find application in a variety of settings. In one aspect, removing the delay would enable a remote spectator to place wagers related to outcomes of the live sporting event while also preventing abuse and cheating. Conventionally, a spectator that is watching the live sporting event in person will receive information instantaneously as the event unfolds. A different spectator who is watching the same live sporting event but at a remote device will receive the same information after a significant delay. The live spectator can tell the remote spectator the play results and cheat systems, so currently remote spectators are typically not allowed to place wagers on live plays. For example, in the context of an American football game, where each play consumes approximately 40 seconds of time, a 60 second delay (typical in current transmission systems) prevents the remote viewer from participating in wagering on a live play since the live play has completed before the viewer receives information of the play.

Figure 1:
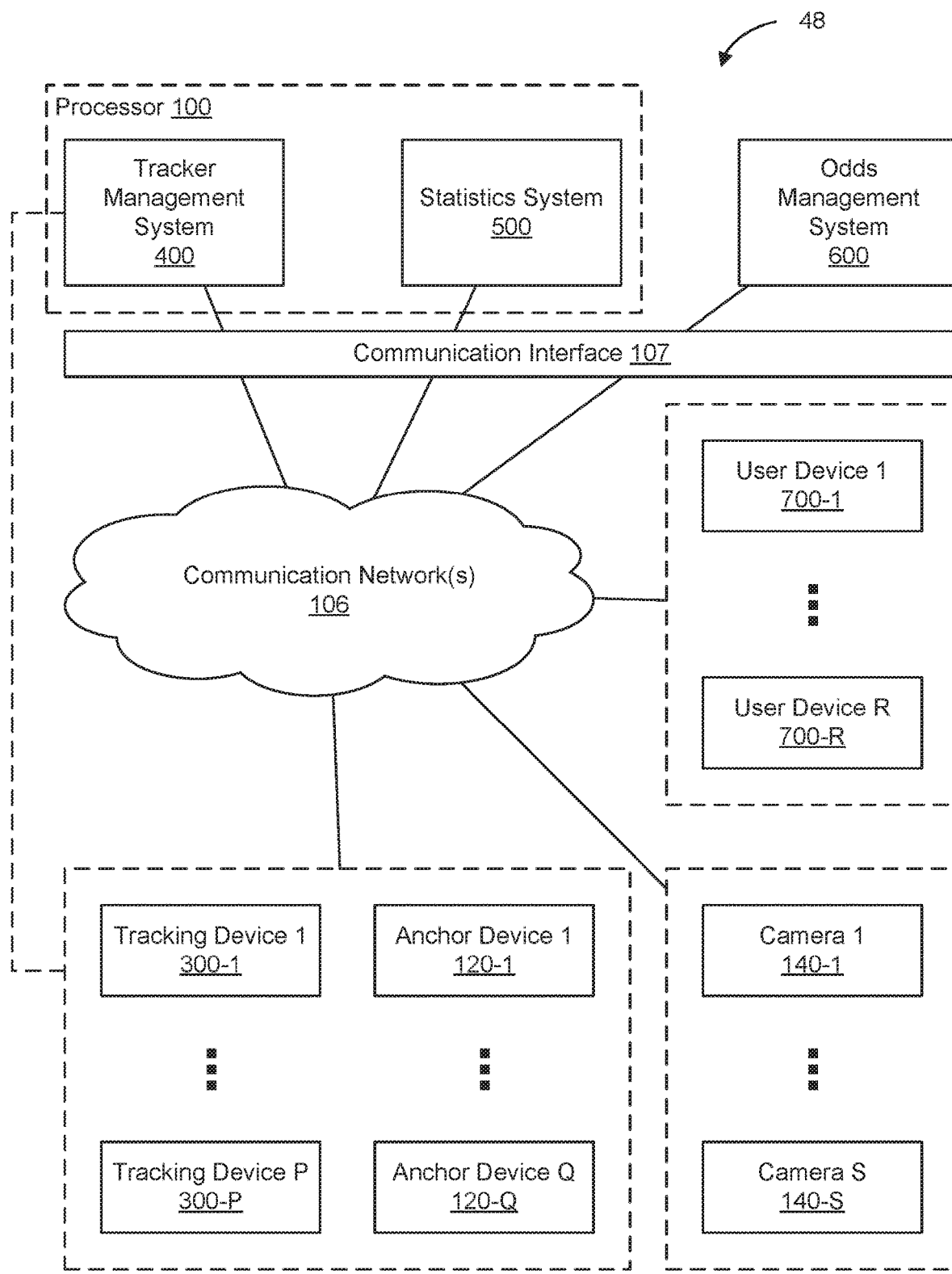
FIG. 1 is a block diagram illustrating an embodiment of a system for providing a real-time representation of positional information of subjects.

FIG. 1 is a block diagram illustrating an embodiment of a system for providing a real-time representation of positional information of subjects. This exemplary system 48 provides a real-time representation of positional information of subjects of a competition between a first competitor and a second competitor. The first competitor includes a first set of one or more participants and a second competitor includes a second set of one or more participants. System 48 includes communication interface 107 and processor 100. Communication interface 107 is configured to receive time-stamped position information of one or more participants of one or both of the first set of participant(s) and the second set of participant(s) in the competition. In various embodiments, the time-stamped position information is captured by a telemetry tracking system during the competition. In this example, the telemetry tracking system is made up of tracking device(s) 300-1 to 300-P, anchor device(s) 120-1 to 120-Q, and optionally camera(s) 140-1 to 140-S, which are managed by tracker management system 400 as further described below.

Processor 100 is coupled to communication interface 107 and configured to calculate, e.g., while the present competition is ongoing, a first covariate parameter for each of one or more participants in one or both of the first set of participants and the second set of participants at and/or as of a point in time. Each respective first covariate parameter is derived from the time-stamped position information of a corresponding participant of the first or second set of one or more participants in the present competition at the point in time. Some examples of covariate parameters are further discussed with respect to Tables 1 and 2 below.

In various embodiments, processor 100 includes tracking management system 400 for tracking a plurality of subjects and statistics system 500 for managing various statistics. Tracking device management system 400 facilitates managing of one or more tracking devices 300 and one or more anchor devices 120 of the system. Statistics system 500 stores and/or generates various statistics for use in predicting an outcome at a competition such as a live sports event, providing a real-time representation of positional information of subjects, providing odds for wagering on various circumstances or outcomes in the sports event, and other similar activities. In various embodiments, tracking management system 400 and statistics system 500 comprise software engines or modules running on processor 100 and/or separate or potentially separate systems, each comprising and/or running on one or more processors comprising processor 100.

In various embodiments, system 48 includes odds management system 600 for managing odds and a plurality of user devices 700-1 to 700-R. Although odds management system 600 is shown external to processor 100, in some embodiments the odds management system is included in the processor. Odds management system 600 facilitates determining odds for outcomes in a sports event and managing various models related to predicting outcomes at the live event.

In some embodiments, the system includes one or more user devices 700 that facilitate end user interaction with various systems of the present disclosure, such as odds management system 600. Moreover, in some embodiments, system 48 includes one or more cameras 140 that capture live images and/or video of a live event that is then utilized by the systems of the present disclosure. In some embodiments, the cameras 140 include one or more high resolution cameras. By way of non-limiting example, the one or more high resolution cameras includes a camera with a 1080p resolution, 1440p resolution, 2K resolution, 4K resolution, or 8K resolution. Utilizing a camera 140 with a high resolution allows for a video feed captured by the camera to be partitioned at a higher resolution, while also allowing for more partitions to be created without a noticeable decline in image quality.

The above-identified components are interconnected, optionally through a communications network. Elements in dashed boxes are optional combined as a single system or device. Of course, other topologies of the computer system 48 are possible. For instance, in some implementations, any of the illustrated devices and systems can in fact constitute several computer systems that are linked together in a network, or be a virtual machine or a container in a cloud computing environment. Moreover, in some embodiments rather than relying on a physical communications network 106, the illustrated devices and systems wirelessly transmit information between each other. As such, the exemplary topology shown in FIG. 1 merely serves to describe the features of an embodiment of the present disclosure in a manner that will be readily understood to one of skill in the art.

In some implementations, the communication network 106 interconnects tracking device management system 400 that manages one or more tracking devices 300 and one or more anchors 120, statistics system 500, odds management system 600, one or more user devices 700, and one or more cameras 140 with each other, as well as optional external systems and devices. In some implementations, the communication network 106 optionally includes the Internet, one or more local area networks (LANs), one or more wide area networks (WANs), other types of networks, or a combination of such networks.

Examples of networks 106 include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In various embodiments, processor 100 includes a machine learning engine 210 (not shown in FIG. 1) that facilitates the prediction of the outcome of a competitions. The next figure describes an example of processor 100 that includes a machine learning engine in greater detail.

Figure 2A:
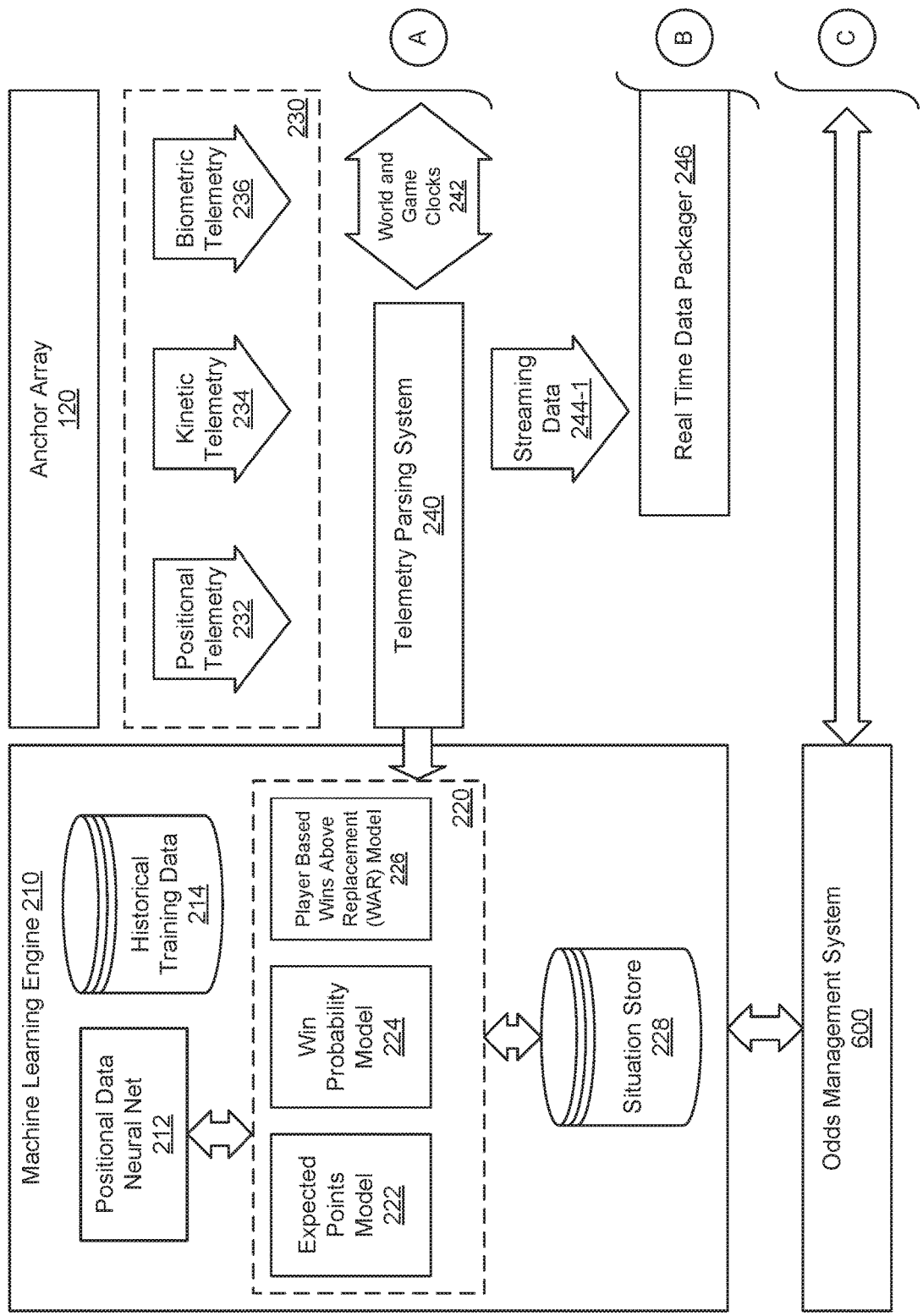
FIG. 2A shows a block diagram illustrating an embodiment of a system for providing a real-time representation of positional information of subjects.
Figure 2B:
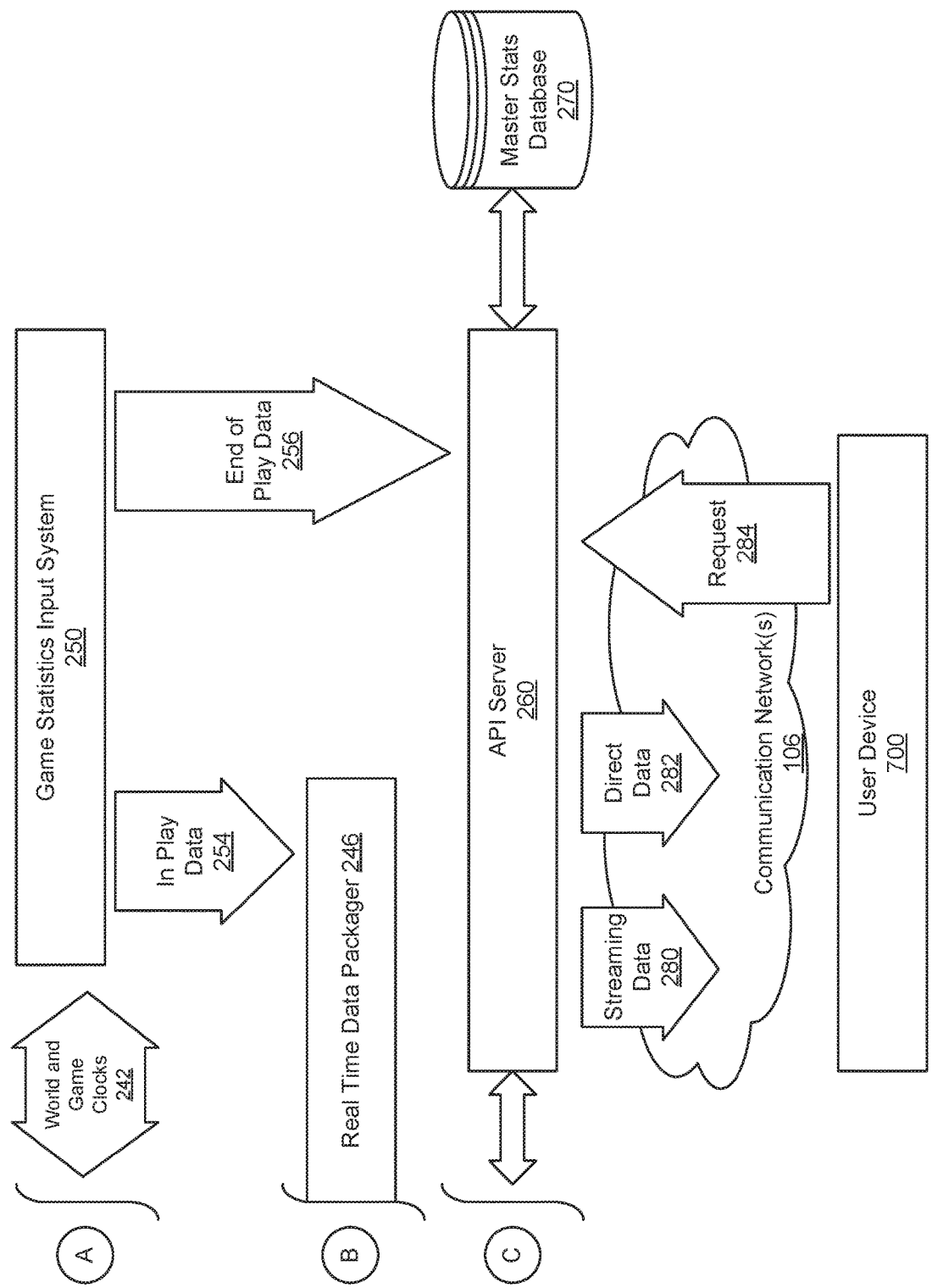
FIG. 2B shows a block diagram illustrating an embodiment of a system for providing a real-time representation of positional information of subjects.

FIGS. 2A and 2B show a block diagram illustrating an embodiment of a system for providing a real-time representation of positional information of subjects. As depicted in FIG. 2A, an array of anchor devices 120 receives telemetry data 230 from one or more tracking devices 300. In order to minimize error in receiving the telemetry from the one or more tracking devices 300, the array of anchor devices 120 preferably includes at least three anchor devices. Inclusion of at least three anchor devices 120 within the array of anchor devices allow for each ping (e.g., telemetry data 230) received from a respective tracking device 300 to be triangulated using the combined data from the at least three anchor that receive the respective ping. Additional details and information regarding systems and methods for receiving pings from tracking devices and the optimization thereof will be described in more detail infra, with particular reference to at least FIGS. 3 and 4.

In the example shown, the telemetry data 230 that is received by the array of anchors 120 from the one or more tracking devices 300 includes positional telemetry data 232. The positional telemetry data 232 provides location data for a respective tracking device 300, which describes a location of the tracking device within a spatial region. In some embodiments, this positional telemetry data 232 is provided as one or more Cartesian coordinates (e.g., an X coordinate, a Y coordinate, and/or Z a coordinate) that describe the position of each respective tracking device 300, although any coordinate system (e.g., polar coordinates, etc.) that describes the position of each respective tracking device 300 is used in alternative embodiments.

The telemetry data 230 that is received by the array of anchors 120 from the one or more tracking devices 300 includes kinetic telemetry data 234. The kinetic telemetry data 234 provides data related to various kinematics of the respective tracking device. In some embodiments, this kinetic telemetry data 234 is provided as a velocity of the respective tracking device 300, an acceleration of the respective tracking device, and/or a jerk of the respective tracking device. Further, in some embodiments one or more of the above values is determined from an accelerometer (e.g., accelerometer 317 of FIG. 3) of the respective tracking device 300 and/or derived from the positional telemetry data 232 of the respective tracking device. Further, in some embodiments the telemetry data 230 that is received by the array of anchors 120 from the one or more tracking devices 300 includes biometric telemetry data 236. The biometric telemetry data 236 provides biometric information related to each subject associated with the respective tracking device 300. In some embodiments, this biometric information includes a heart rate of the subject, temperature (e.g., a skin temperature, a temporal temperature, etc.), and the like.

In some embodiments, the array of anchors 120 communicates the above described telemetry data (e.g., positional telemetry 232, kinetic telemetry 234, biometric telemetry 236) to a telemetry parsing system 240. Accordingly, in some embodiments the telemetry parsing system 240 communicates the telemetry data (e.g., stream of data 244) to a machine learning engine 210 and/or a real time data packager 246 for further processing and analysis.

In some embodiments, the real time data packager 246 synchronizes one or more data sources (e.g., streaming data 244 from telemetry parsing system 240, game statistics input system 250, machine learning engine 210, etc.) by using one or more timestamps associated with the respective data. For instance, in some embodiments the data sources provide data that is associated with a real world clock timestamp (e.g., an event occurred at and is associated with a real world time of 1:17 P.M.). In some embodiments, the data sources provide data that is associated with a game clock timestamp related to a live sports event (e.g., an event occurred with 2 minutes and 15 seconds remaining in the second quarter). Moreover, in some embodiments the data sources provide data that is associated with both the real world clock timestamp and the game clock timestamp. Synchronization of the data sources via timestamps allows for a designer of the present disclosure to provide services with an additional layer of accuracy, particularly with betting and wagering on outcomes at a live event. For instance, in some embodiments data provided to a user device 700 (e.g., streaming data 280 and/or direct data 282 of FIG. 2B) describes the wagering (e.g., odds) on a next play in a football game. In order to determine if an end user of the user device 700 places a wager within a predetermined window of time (e.g., before the snap of the ball of the next play), the game clock and real world time data received from the user device and/or communicated to the user device are analyzed and the wager is either validated, rejected, or held for further consideration.

In some embodiments, machine learning engine 210 receives data from various sources of the present disclosure in order to predict a future outcome at a live sporting event and generate statistics for analysis and use. For instance, in some embodiments the data sources of the machine learning engine 210 includes a positional data formation classifier 212, hereinafter "neural net," that provides information related to various configurations and formations of players at any given point of time in game. For instance, in some embodiments the formation classifier 212 parses the telemetry data 230 to analyze pre-snap formations of players. The analyses of the pre-snap telemetry data 230 allows for the formation classifier 212 to determine various states and conditions of the game, such as a down of a game, a positional rule violation within a game (e.g., off-sides, illegal motion, etc.), and the like. Moreover, in some embodiments the formation classifier 212 analyzes telemetry data 230 that is received subsequent the start of the play in order to further generate data and information related to how each formation evolves (e.g., an expected running route versus an actual running route, an expected blocking assignment versus an action blocking assignment, a speed of a player throughout a play, a distance between two players throughout a play, etc.).

In some embodiments, machine learning engine 210 includes a historical training data store 214. Historical data store 214 provides historical data and information related to each particular sport (e.g., sports historical data 508 of FIG. 5), each particular team associated with the particular sport (e.g., team historical data 510 of FIG. 5), and/or each particular player associated with the particular sport and/or team (e.g., player historical data 514 of FIG. 5). In some embodiments, this data is initially used as a training data set for the machine learning engine 210. However, the present disclosure is not limited thereto as this data may also be used to further augment the features and services provided by the machine learning engine 210 and other systems of the present disclosure.

Further, in some embodiments the machine learning engine 210 includes a variety of models 220 that are utilized to predict a future outcome of a sporting event and provide analysis of the sporting event. In some embodiments, the models 220 of the machine learning engine 210 include an expected points model 222. The expected points model 222 provides a likelihood of receiving points for a particular play at the event via a numerical value. In some embodiments, the models 220 of the machine learning engine 210 include a win probability model 224 that provides either a likelihood of each participating team of the event to win or a likelihood of any given point spread between the winning and losing teams at the event. Furthermore, in some embodiments the models 220 of the machine learning engine 210 include a player based wins above replacement (WAR) model 226. The WAR model 226 provides a contribution value a respective player adds to their corresponding team (e.g., player 1 provides a value of 1 to a respective team and player two provides a value of 2 to the respective team, therefore player two is worth more to the respective team).

In some embodiments, machine learning engine 210 include a situation store 228. The situation store 228 is a cache of various situational details and/or statistics that is accessed rapidly during a real game scenario. Rapid access to the situation store 228 prevents lag that would otherwise be induced from querying different databases and systems (e.g., positional data formation classifier 212, historical training data 214, etc.) in order to obtain the same information. For instance, in some embodiments the situation store 228 determines which subjects are currently on a field of play in a game (e.g., determine by parsing telemetry data 230). Since subjects that are currently on the field of play are generating statistics through their respective play, while also being the top of commentary, the statistics of these subjects are highly relevant. Accordingly, due to the finite nature of memory within situation store 228, statistics related to the subjects that are on the field of play are stored within the situation store at the expensive of statistics related to subjects that are not on the field of play. Additional details and information regarding the machine learning engine and the components therein, including the various above described data stores and models, will be described in more detail infra, with particular reference to at least FIGS. 5 and 6.

Machine learning engine 210 communicates various odds and outputs of the various databases and models therein to an odds management system 600. In communicating with the machine learning engine 210, the odds management system 600 provides various wagers and predictive odds for future events at a sporting event to the user devices 700, while also updating these odds in real time to reflect current situations and statistics of a game.

As depicted in FIG. 2B, in some embodiments system 48 includes a game statistics input system 250. The game statistics input system 250 is configured for providing at least in play data 254, which, in example case of football, describes a state of the game during a given play (e.g., a weak side receiver ran a post route), as well as end of play data 256, which describes a state of the game after a given play (e.g., a play resulted in a first down at the opponents 42-yard line). In some embodiments, the data of the statistics input system 250 is associated with the world and game clock 242, and accordingly is communicated to the telemetry parsing system 240 and/or the machine learning engine 210. In some embodiments the game statistics input system 250 is subsumed by the formation classifier 212.

In some embodiments, various data is communicated to an application programing interface (API) server 260. This data may include streaming data 244, end of play data 256, data from the odds management system 600, or a combination thereof. Accordingly, the API server 260 facilitates communication between various components of the system 48, one or more user devices 700, and a master statistics database 270 in order to provide various features and services of the present disclosure (e.g., a stream of the game, a request for statistics, placing a wager on a play, etc.). Communication between the API server 260 and the one or more user devices 700 includes providing streaming data 280 and/or direct data 282 to each respective user device 700 through the communications network 106, as well as receiving various requests 284 from each respective user device. By way of non-limiting example, streaming data 280 includes tracking "telemetry" data including xyz coordinates of players or accelerometer data of players, direct data 282 includes clock, score, or remaining timeouts.

In some embodiments, the master statistics database 270 includes some or all of the statistics known to the machine learning engine 210 that are obtainable to a user. The master statistics database is updated regularly such as at the end of every play or every few plays. For instance, in some embodiments only a portion of the statistics known to the machine learning engine 210 is desired to be obtainable by a user, and thus is stored in the master statistics database 270. However, the present disclosure is not limited thereto. For instance, in some embodiments the master statistics database 270 is subsumed by the machine learning engine 270. Elements in dashed boxes are optional combined as a single system or device.

Now that an infrastructure of the system 48 has been generally described, an exemplary tracking device 300 will be described with reference to FIG. 3.

Figure 3:
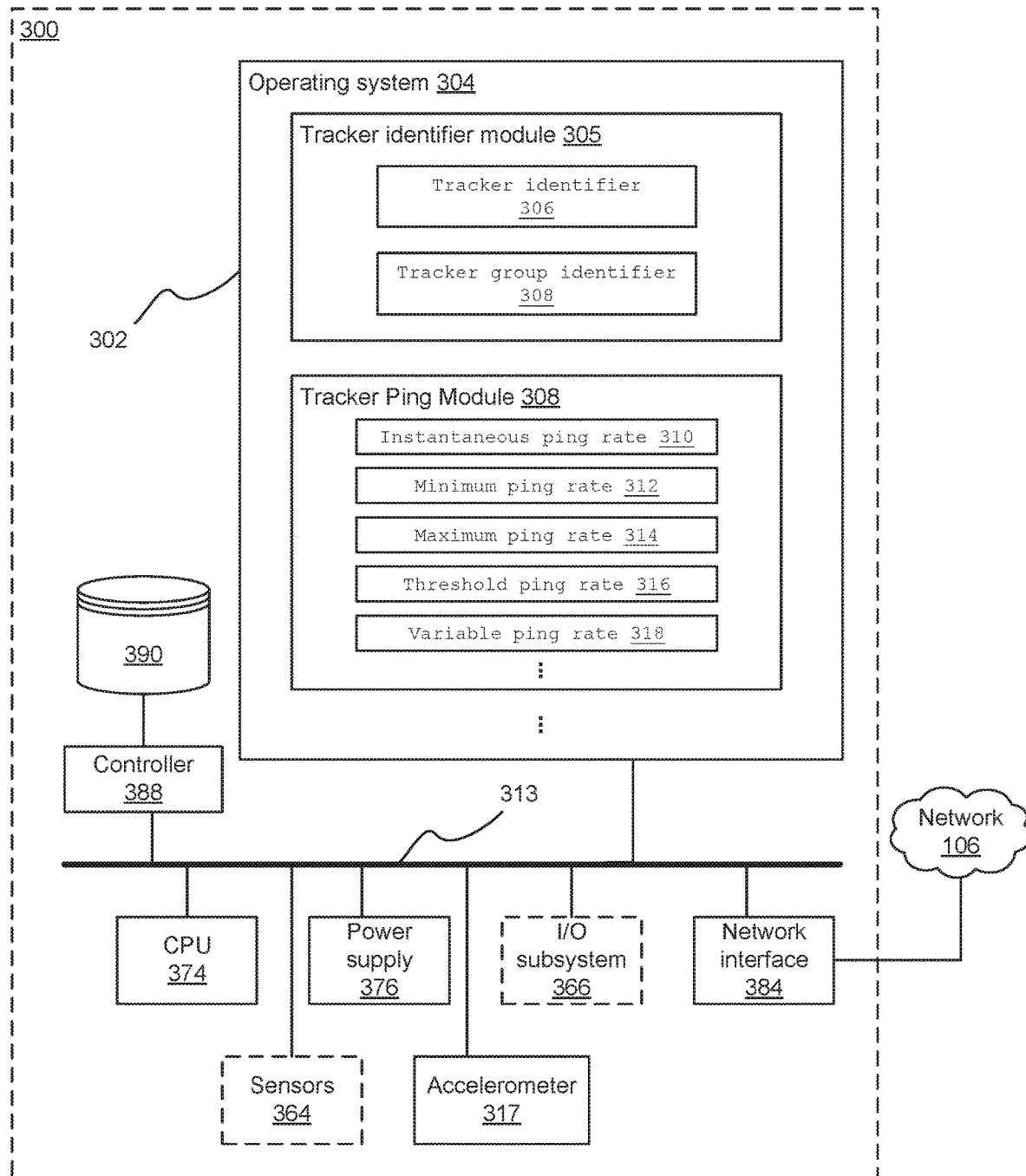
FIG. 3 is a block diagram illustrating an embodiment of a tracking device.

FIG. 3 is a block diagram illustrating an embodiment of a tracking device. In various implementations, the tracking device, hereinafter also a "tracker," includes one or more processing units (CPUs) 374, a memory 302 (e.g., a random access memory), one or more magnetic disk storage and/or persistent device 390 optionally accessed by one or more controllers 388, a network or other communications interface (which may include RF circuitry) 384, an accelerometer 317, one or more optional intensity sensors 364, an optional input/output (I/O) subsystem 366, one or more communication busses 313 for interconnecting the aforementioned components, and a power supply 376 for powering the aforementioned components. In some implementations, data in memory 302 is seamlessly shared with non-volatile memory 390 using known computing techniques such as caching. In some implementations, memory 302 and/or memory 390 may in fact be hosted on computers that are external to the tracking device 300 but that can be electronically accessed by the tracking device 300 over an Internet, intranet, or other form of network or electronic cable (illustrated as element 106 in FIG. 1) using network interface 384.

In various embodiments, the tracking device 300 illustrated in FIG. 3 includes, in addition to accelerometer(s) 317, a magnetometer and/or a GPS (or GLONASS or other global navigation system) receiver for obtaining information concerning a location and/or an orientation (e.g., portrait or landscape) of the tracking device 300.

It should be appreciated that the tracking device 300 illustrated in FIG. 3 is only one example of a device that may be used for obtaining telemetry data (e.g., positional telemetry 232, kinetic telemetry 234, and biometric telemetry 236) of a corresponding subject, and that the tracking device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Memory 302 of the tracking device 300 illustrated in FIG. 3 optionally includes high-speed random access memory and optionally also includes non-volatile memory, such as one or more magnetic disk storage devices, flash memory devices, or other non-volatile solid-state memory devices. Access to memory 302 by other components of the tracking device 300, such as CPU(s) 374 is, optionally, controlled by the memory controller 388.

In some embodiments, the CPU(s) 374 and memory controller 388 are, optionally, implemented on a single chip. In some other embodiments, the CPU(s) 374 and memory controller 388 are implemented on separate chips.

Radio frequency (RF) circuitry of network interface 384 receives and sends RF signals, also called electromagnetic signals. In some embodiments, the RF circuitry 384 converts electrical signals to from electromagnetic signals and communicates with communication networks and other communications devices, such as the one or more anchor devices 120 and/or the tracking device management system 400, via the electromagnetic signals. The RF circuitry 384 optionally includes well-known circuitry for performing these functions, including but not limited to an antenna system, a RF transceiver, one or more amplifiers, a tuner, one or more oscillators, a digital signal processor, a CODEC chipset, a subscriber identity module (SIM) card, memory, and so forth. On some embodiments, the RF circuitry 384 optionally communicates with the communication network 106.

In some embodiments, the network interface (including RF circuitry) 384 operates via ultra-wide band (UWB) technology, which allows for the tracking device 300 to communicate with an array of anchor devices 120 in a crowded spatial region, such as a live sporting event. In some embodiments, the tracking device 300 transmits a low power (e.g., approximately 1 milliwatt (mW)) signal at a predetermined center frequency (e.g., 6.55 GHz 200 mHz, yielding a total frequency range of transmission of approximately about 6.35 GHz to about 6.75 GHz). As used herein, these communications and transmissions are hereinafter referred to as a "ping." For a discussion of UWB, see Jiang et al, 2000, "Ultra-Wide Band technology applications in construction: a review," Organization, Technology and Management in Construction 2(2), 207-213.

In some embodiments, the power supply 358 optionally includes a power management system, one or more power sources (e.g., a battery, a recharging system, a power failure detection circuit, a power converter or inverter, a power status indicator (e.g., a light-emitting diode (LED)) and any other components associated with the generation, management and distribution of power in such tracking devices 300. In some embodiments, the telemetry data 230 includes information related to the power supply 358 of the respective tracking device 300, such as a battery consumption or an expected period of time until the tracking device requires more power.

In some implementations, the memory 302 of the tracking device 300 for tracking a respective subject stores:

an operating system 304 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;

a tracking device identifier module 305 that stores data used to identify the respective tracking device 300 including a tracking device identifier 306 and an optional tracking device group identifier 307; and a tracking device ping module 308 that stores data and information related to a ping rate of the respective tracking device, the tracking device ping module 308 including:

an instantaneous ping rate 310 that describes a current ping rate a respective tracking device 300 is currently operating at, a minimum ping rate 312 that describes a minimum ping rate a respective tracking device 300 may operate at, a maximum ping rate 314 that describes a maximum ping rate a respective tracking device 300 may operate at, a threshold ping rate 316 that describes a minimum ping rate a respective tracking device 300 may operate at, and a variable ping rate flag 318.

The tracking device identifier module 305 stores information that relates to identifying the respective tracking device 300 from a plurality of tracking devices (e.g., tracking device 1 300-1, tracking device 2 300-3, . . . , tracking device P 300-P). In some embodiments, the information stored by the tracking device identifier module 305 includes a tracking device identifier (ID) 306 that includes a unique ID (e.g., a serial number or a code) representing the respective tracking device 300. In some embodiments, the tracking device ID module 305 includes a tracking device group ID 307 that designates the respective tracking device 300 to one or more groups of tracking devices (e.g., tracking device group 418-2 of FIG. 4). Further, in some embodiments pings communicated by the respective tracking device 300 includes data of the tracking device ID module 305, allowing for an array of anchor devices 120 to identify pings received from more than one tracking device. Additional details and information regarding the grouping of a tracking device 300 will be describe in more detail infra, with particular reference to at least FIG. 4.

The tracking device ping module 308 stores data and information related to various ping parameters and conditions of respective tracking device 300, as well as facilitating management of the ping. For instance, in some embodiments the tracking device ping module 308 manages an instantaneous ping rate 310 of the respective tracking device 300 (e.g., managing an instantaneous ping rate 310 to be 10 Hertz (HZ)). In some embodiments, the tracking device 300 is configured with one or more ping rate limits, including one or more both of a minimum ping rate 312 and a maximum ping rate 314, that define a maximum and a minimum ping rate that the tracking device 300 may transmit pings. For instance, in some embodiments the minimum ping rate 312 and/or the maximum ping rate 314 may be set by the tracking device management system 400 based upon one or more of bandwidth limitations, a number of active tracking devices 300, and a type of expected activity (e.g., a sport and/or event types, an expected subject activity, etc.). When configured with one or both ping rate limits, the tracking device ping module 308 operates to adjust the instantaneous ping rate 310 between the minimum ping rate 312 and the maximum ping rate 314. Thus, automatic optimization of tracking management system 400 may be used in combination with automatic ping rate adjustment of tracking device 300. In some embodiments, tracking device ping module 308 is configured to compare detected motion from accelerometer 317 to a predefined threshold 316. Accordingly, the ping module 308 increases the instantaneous ping rate 310 in accordance with a determination that the detected motion is greater than predefined threshold 316 (e.g., until the instantaneous ping rate 310 reaches the maximum ping rate 314). Likewise, the ping module 308 decreases the instantaneous ping rate 310 (e.g., until the instantaneous ping rate 310 reaches the minimum ping rate 312) in accordance with a determination that the detected motion is less than the threshold ping rate 316.

In some embodiments, the ping module 308 includes a variable ping rate flag 318, which is configured (e.g., set wirelessly) by the tracking device management system 400, that determines whether ping module 308 automatically, or not, changes the instantons ping rate 310 based upon determined activity. For example, the tracking device management system 400 may set variable ping rate flag 318 to "false" for one or more tracking devices 300 that is associated with a player not currently participating on the field of play, wherein instantaneous ping rate 310 remains at a low rate even if the player is actively warming up for example. Tracking device management system 400 sets variable ping rate flag 318 to "true" for one or more players that is actively participating on the field of play. Furthermore, in some embodiments each tracking device 300 is dynamically configured based upon a location of the respective tracking device. For instance, in accordance with a determination that a tracking device 300 is within a field of play (e.g., if a player is actively participating in a game) as opposed to a determination that the tracking device is off the field of play (e.g., if a player is not actively participating in a game).

Utilizing the tracking device ping model 308 and/or the sensor (e.g., accelerometer 317 and/or optional sensors 364) within tracking device 300 increases reliability of the system 48 (e.g., the array of anchors 120, the telemetry parsing system 240, the tracking device management system 400, etc.) to track subjects disposed with the tracking device.

As previously described, in some embodiments each tracking device 300 provides telemetry data 230 that is received and communicated by various anchors 120 that are proximate to the respective tracking device 300. This telemetry data includes positional telemetry data 232 (e.g., X, Y, and/or Z coordinates), kinetic telemetry data 234 (e.g., velocity, acceleration, and/or jerk), and/or biometric telemetry data 236 (e.g., heart rate, physical attributes of a player such as shoulder width, etc.).

In some embodiments, each subject in the game is equipped with more than one tracking device 300 in order to increase the accuracy of the data received from the tracking devices about the subject. For instance, in some embodiments the left shoulder and the right shoulder of a respective subject are both equipped with a tracking device 300, each such tracking device functioning normally and having line of site to at least a subset of the anchors 120. Accordingly, in some embodiments the data from the left and right tracking devices 300 have their telemetry data 230 combined to form a single time-stamped object. This single object combines positional data from both tracking devices 300 to create a center line representation of a position of the respective player. Moreover, this center line calculated position provides a more accurate representation of the center of a player's position on the playing field. Further, using the relative positional data from two tracking devices 300 positioned on the left and right shoulders of a player, prior to creating the single player object as described above, allows the system 48 to determine a direction (e.g., a rotation) that the player is facing. In various embodiments, including rotational data greatly eases the task of creating avatars from data created by recording telemetry data 230 during a game and/or establishing sophisticated covariates that can be used to better predict future events in the game or the final outcome of the game itself.

While the above description includes tracking devices disposed on the left and right shoulders of respective subjects, the present disclosure is not limited thereto. For instance, in some embodiments a respective subject has three or more tracking devices disposed on their body or attire (e.g., pads, guards, uniform, etc.)

In some embodiments, the tracking device 300 has any or all of the circuitry, hardware components, and software components found in the device depicted in FIG. 3. In the interest of brevity and clarity, only a few of the possible components of the tracking device 300 are shown to better emphasize the additional software modules that are installed on the tracking device 300.

Figure 4:
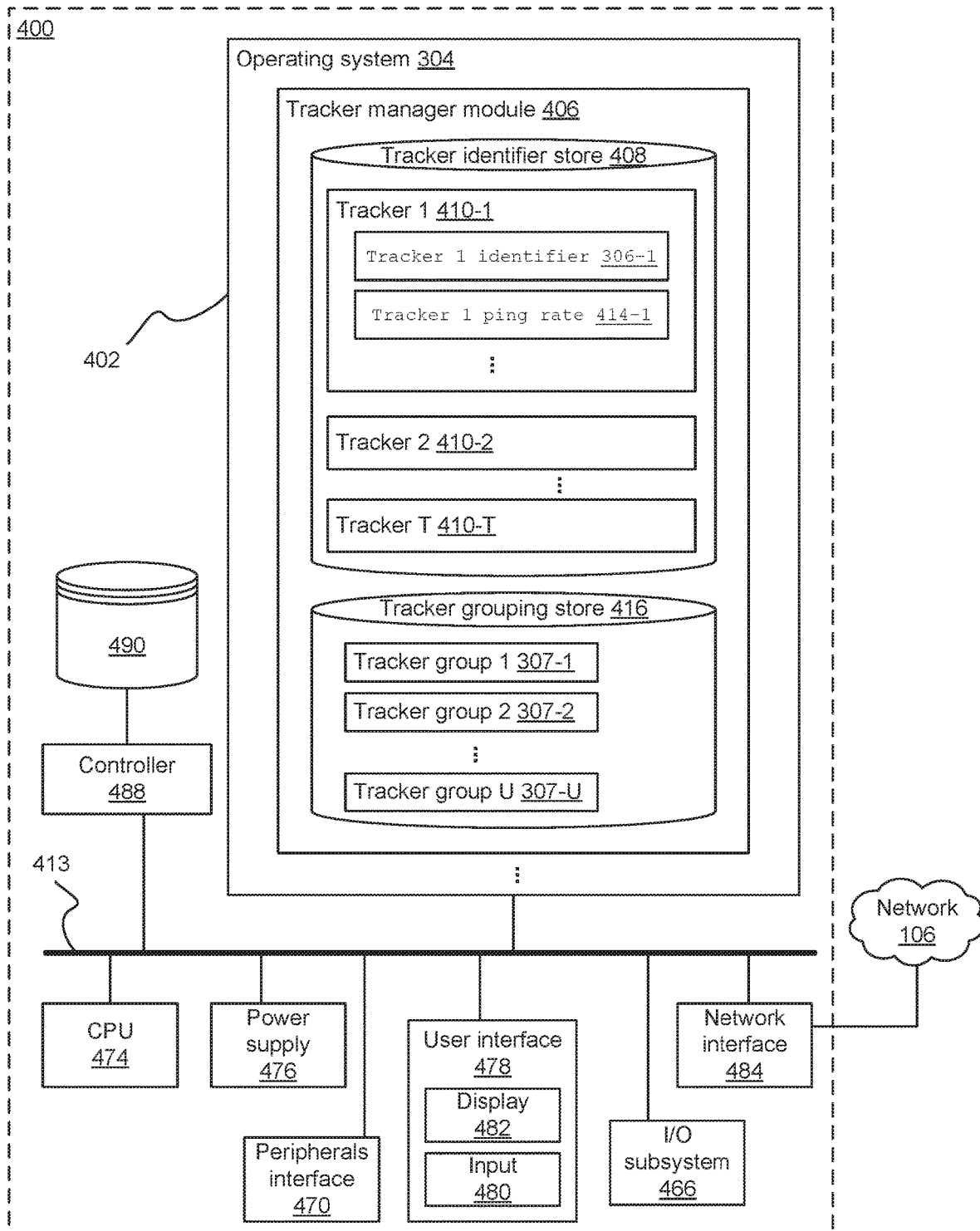
FIG. 4 is a block diagram illustrating an embodiment of a tracking device management system.

FIG. 4 is a block diagram illustrating an embodiment of a tracking device management system. Tracking device management system 400 is associated with one or more tracking devices 300 and anchors 120. The tracking device management system 400 includes one or more processing units (CPUs) 474, a peripherals interface 470, a memory controller 488, a network or other communications interface 484, a memory 402 (e.g., random access memory), a user interface 478, the user interface 478 including a display 482 and an input 480 (e.g., a keyboard, a keypad, a touch screen, etc.), an input/output (I/O) subsystem 466, one or more communication busses 413 for interconnecting the aforementioned components, and a power supply system 476 for powering the aforementioned components.

In some embodiments, the input 480 is a touch-sensitive display, such as a touch-sensitive surface. In some embodiments, the user interface 478 includes one or more soft keyboard embodiments. The soft keyboard embodiments may include standard (QWERTY) and/or non-standard configurations of symbols on the displayed icons.

It should be appreciated that tracking device management system 400 is only one example of a system that may be used in engaging with various tracking devices 300, and that tracking device management system 400 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more magnetic disk storage devices, flash memory devices, or other non-volatile solid-state memory devices. Access to memory 402 by other components of the management system 400, such as CPU(s) 474 is, optionally, controlled by memory controller 488.

Peripherals interface 470 can be used to couple input and output peripherals of the management system to CPU(s) 474 and memory 402. The one or more processors 474 run or execute various software programs and/or sets of instructions stored in memory 402 to perform various functions for the management system 400 and to process data.

In some embodiments, peripherals interface 470, CPU(s) 474, and memory controller 488 are, optionally, implemented on a single chip. In some other embodiments, they are, optionally, implemented on separate chips.

In some embodiments, power system 476 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 4, memory 402 of the tracking device management system preferably stores:

an operating system 404 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components; and a tracking device manager module 406 for facilitating management of one or more tracking devices 300, the tracking device manager module including:

a tracking device identifier store 408 for storing pertinent information related to each respective tracking device 410-1 including a tracking device identifier 306 and a tracking device ping rate 414, and a tracking device grouping store 416 for facilitating management of or more tracking device groups 307.

The tracking device identifier store 408 includes information related to each respective tracking device 410-1, including the tracking device identifier (ID) 306 for each respective tracking device 300 as well as a tracking device group 307 to which the respective tracking device is associated. For instance, in some embodiments a first tracking device group 307-1 is associated with the left shoulder of each respective subject and a second tracking device group 307-2 is associated with a right shoulder of each respective subject. Moreover, in some embodiments a third tracking device group 307-3 is associated with a first position (e.g., receiver, defensive end, safety, etc.) of each respective subject and a fourth tracking device group 307-4 is associated with a second position. Grouping 307 of the tracking devices 300 allows for a particular group to be designated with a particular ping rate (e.g., a faster ping rate for running backs). Grouping 307 of the tracking devices 300 also allows for a particular group to be isolated from other tracking devices that are not associated with the respective group, which is useful in viewing representations of the telemetry data 230 provided by the tracking devices of the group. Additional information related to tracking devices and tracking device management systems is found in U.S. Pat. No. 9,950,238, entitled "Object Tracking System Optimization and Tools."

Figure 5:
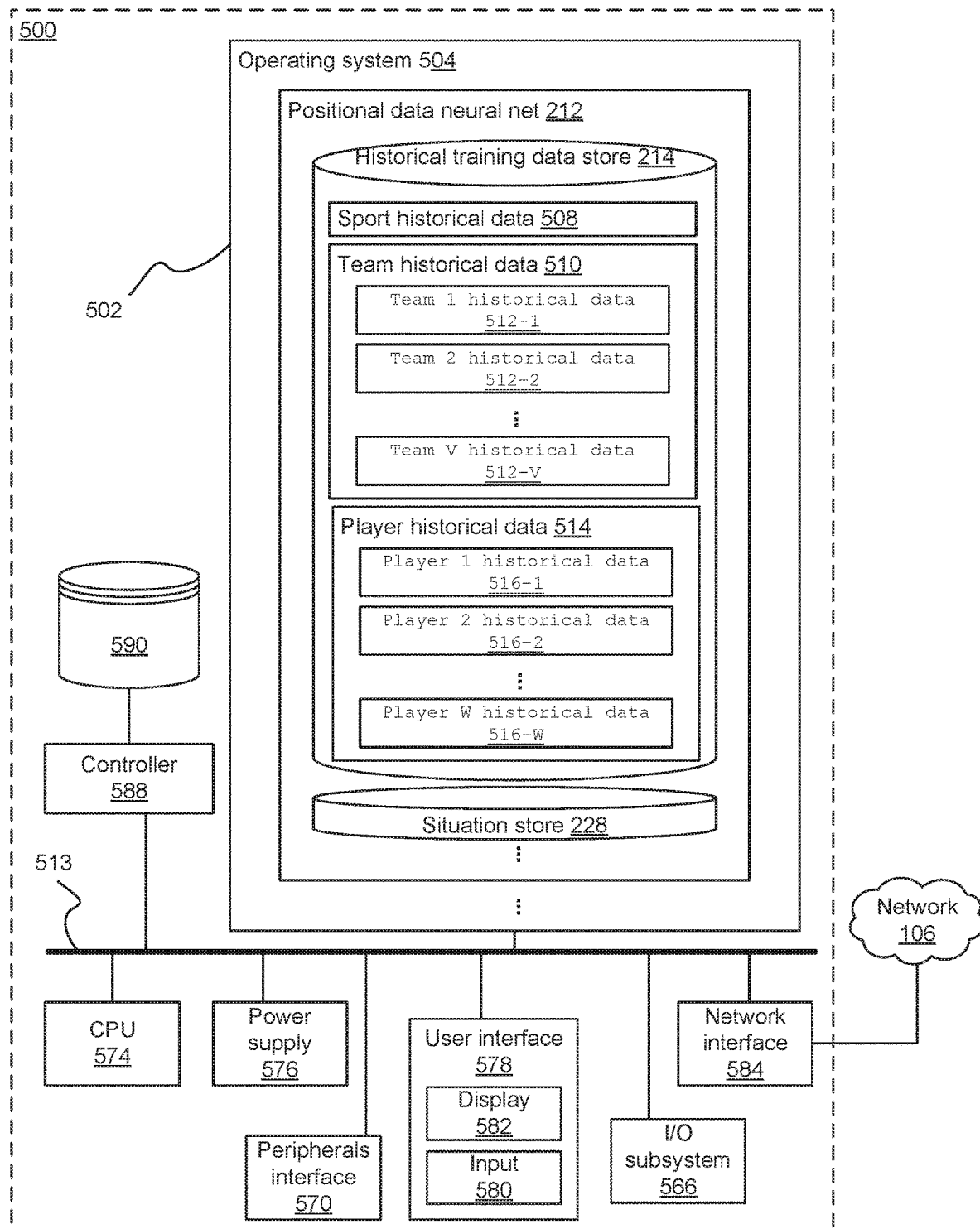
FIG. 5 is a block diagram illustrating an embodiment of a statistics system.

FIG. 5 is a block diagram illustrating an embodiment of a statistics system. Statistics system 500 stores and determines various statistics in accordance with the present disclosure. The statistics system 500 includes one or more processing units (CPUs) 574, peripherals interface 570, memory controller 588, a network or other communications interface 584, a memory 502 (e.g., random access memory), a user interface 578, the user interface 578 including a display 582 and an input 580 (e.g., a keyboard, a keypad, a touch screen, etc.), input/output (I/O) subsystem 566, one or more communication busses 513 for interconnecting the aforementioned components, and a power supply system 576 for powering the aforementioned components.

In some embodiments, the input 580 is a touch-sensitive display, such as a touch-sensitive surface. In some embodiments, the user interface 578 includes one or more soft keyboard embodiments. The soft keyboard embodiments may include standard (e.g., QWERTY) and/or non-standard configurations of symbols on the displayed icons.

It should be appreciated that statistics system 500 is only one example of a system that may be used in staring and determining various statistics, and that statistics system 500 optionally has more or fewer components than shown, optionally combines two or more components, or optionally has a different configuration or arrangement of the components. The various components shown in FIG. 5 are implemented in hardware, software, firmware, or a combination thereof, including one or more signal processing and/or application specific integrated circuits.

Memory 502 optionally includes high-speed random access memory and optionally also includes non-volatile memory, such as one or more magnetic disk storage devices, flash memory devices, or other non-volatile solid-state memory devices. Access to memory 502 by other components of the statistics system 500, such as CPU(s) 574 is, optionally, controlled by memory controller 588.

Peripherals interface 570 can be used to couple input and output peripherals of the management system to CPU(s) 574 and memory 502. The one or more processors 574 run or execute various software programs and/or sets of instructions stored in memory 502 to perform various functions for the statistics system 500 and to process data.

In some embodiments, peripherals interface 570, CPU(s) 574, and memory controller 588 are, optionally, implemented on a single chip. In some other embodiments, they are, optionally, implemented on separate chips.

In some embodiments, power system 576 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 5, memory 502 of the remote user device preferably stores:
- an operating system 504 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;
- a positional formation classifier 212 for determining and analyzing formations of players;
- a historical training data store 214 for storing various statistics related to each sport 508, wherein each sport 508 including various team historical data 510 for one or more teams 512, as well as various player statistics 514 for one or more players 516; and
- a situational store 228 for storing data related to formations of players and game situations.

The positional formation classifier 212 (sometimes simply called a formation classifier) provides information related to various states and formations of players at any given point of time in game. For instance, in some embodiments the formation classifier 212 parses telemetry data 230 in order to determine pre-snap formations. Accordingly, once a formation is determined and telemetry data 230 is parsed, sub-categories of the formation may be determined (e.g., an I-formation with different sub-categories defining different running backs). Moreover, in some embodiments the formation classifier 212 acts as a virtual referee and determines if infractions have occurred within a game or play, such as a player being off-sides, a neutral zone infraction, an illegal motion, an illegal formation, and the like. In some embodiments, the formation classifier 212 includes one or more tables of various formations in a football game, such as a first table of offensive formations, a second table of defensive formations, and a third table of special teams formations. In some embodiments, the above table of formations provides some or all of the formations described by Table 1, Table 2, and Table 3.

TABLE 1

Exemplary Offensive Football Formations

| Exemplary Formation |
| --- |
| Double wing formation |
| Empty backfield formation |
| Goal line formation |
| I formation |
| Pistol formation |
| Pro set formation |
| Short punt formation |
| Shotgun formation |
| Single set back formation |
| Single wing formation |
| T formation |
| Tackle spread formation |
| V formation |
| Victory formation |
| Wing T formation |
| Wishbone formation |

TABLE 2

Exemplary Defensive Football Formations

| Exemplary Formation |
| --- |
| 38 formation |
| 46 formation |
| 2-5 formation |
| 3-4 formation |
| 4-3 formation |
| 4-4 formation |
| 5-2 formation |
| 5-3 formation |
| 6-1 formation |
| 6-2 formation |
| Seven-man line formation |
| Nickle formation |
| Dime formation |
| Quarter formation |
| Half dollar formation |

TABLE 3

Exemplary Special Teams Football Formations

| Exemplary Formation |
| --- |
| Field goal formation |
| Kick return formation |
| Kickoff formation |
| Punt formation |

Additionally, in some embodiments the formation classifier 212 determines a ball carrier by comparing telemetry data 230 provided by the ball and telemetry data of a player that is closest to the ball. Likewise, in some embodiments determining which team has possession of the ball is conducted in a similar manner. Furthermore, in some embodiments the formation classifier 212 determines if a player is within a boundary of a game by analyses the telemetry data 230 extracted from the player and comparing this with the known boundaries of the field of play. In this way, the formation classifier 212 parses telemetry data 230 to provide a box score and/or automatic color commentary of a game.

While the formation classifier 212 is labeled a "neural net" it will be appreciated that the formation classifier 212 module does not have to perform classification of team formation using a neural network classifier. In some embodiments the formation classifier 212 module does in fact make use of any classification scheme that can discern a team formation from telemetry data. For instance, in some embodiments formation classifier 212 makes use of a nearest neighbor algorithm to perform the classification of team formation. In other embodiments formation classifier 212 makes use of clustering to perform the classification of team formation. In some embodiments the elucidation of the formation class by formation classifier 212 is used as a covariate in statistical models that predict the outcome of a current live game (e.g., win/loss, point spread, etc.) as disclosed with respect to methods and features described with respect to FIG. 8.

In more detail, in some embodiments, the formation classifier 212 is based on a logistic regression algorithm, a neural network algorithm, a support vector machine (SVM) algorithm, a Naive Bayes algorithm, a nearest-neighbor algorithm, a boosted trees algorithm, a random forest algorithm, or a decision tree algorithm.

By way of non-limiting example the formation classifier 212 is based on a logistic regression algorithm, a neural network algorithm, a support vector machine (SVM) algorithm, a Naive Bayes algorithm, a nearest-neighbor algorithm, a boosted trees algorithm, a random forest algorithm, or a decision tree algorithm. When used for classification, SVMs separate a given set of binary labeled data training set with a hyper-plane that is maximally distant from the labeled data. For cases in which no linear separation is possible, SVMs can work in combination with the technique of 'kernels', which automatically realizes a non-linear mapping to a feature space. The hyper-plane found by the SVM in feature space corresponds to a non-linear decision boundary in the input space. Tree-based methods partition the feature space into a set of rectangles, and then fit a model (like a constant) in each one. In some embodiments, the decision tree is random forest regression. One specific algorithm that can serve as the formation classifier 212 for the instant methods is a classification and regression tree (CART). Other specific decision tree algorithms that can serve as the formation classifier 212 for the instant methods include, but are not limited to, ID3, C4.5, MART, and Random Forests.

In some embodiments, the historical data store 214 stores statistics related to each sport 508, each team 510 within the sport league, as well as the respective players 512. As previously described, in some embodiments the data stored in the historical data store 214 is utilized as a training set of data for machine learning engine 210 and/or formation classifier 212. For instance, in some embodiments the data stored in the historical data store 214 is utilized as an initial data set at a start of a league, as in inferred from other data sets of similar league (e.g., using college football stats if a player is a professional rookie), or utilized to create data points if a new statistic is being generated (e.g., a previously unknown statistic becomes relevant). Furthermore, in some embodiments data from a previously played game is stored within the historical data store 214.

In some embodiments, the situation store 228 includes data stored in one or more databases of the machine learning engine 210 as a cache of information. This cache of the situation store 228 allows for data to be queried for and utilized rapidly, rather than having to query each respective database. In some embodiments, the situation store 288 creates a new cache of data for each respective game. However, the present disclosure is not limited thereto.

Figure 6:
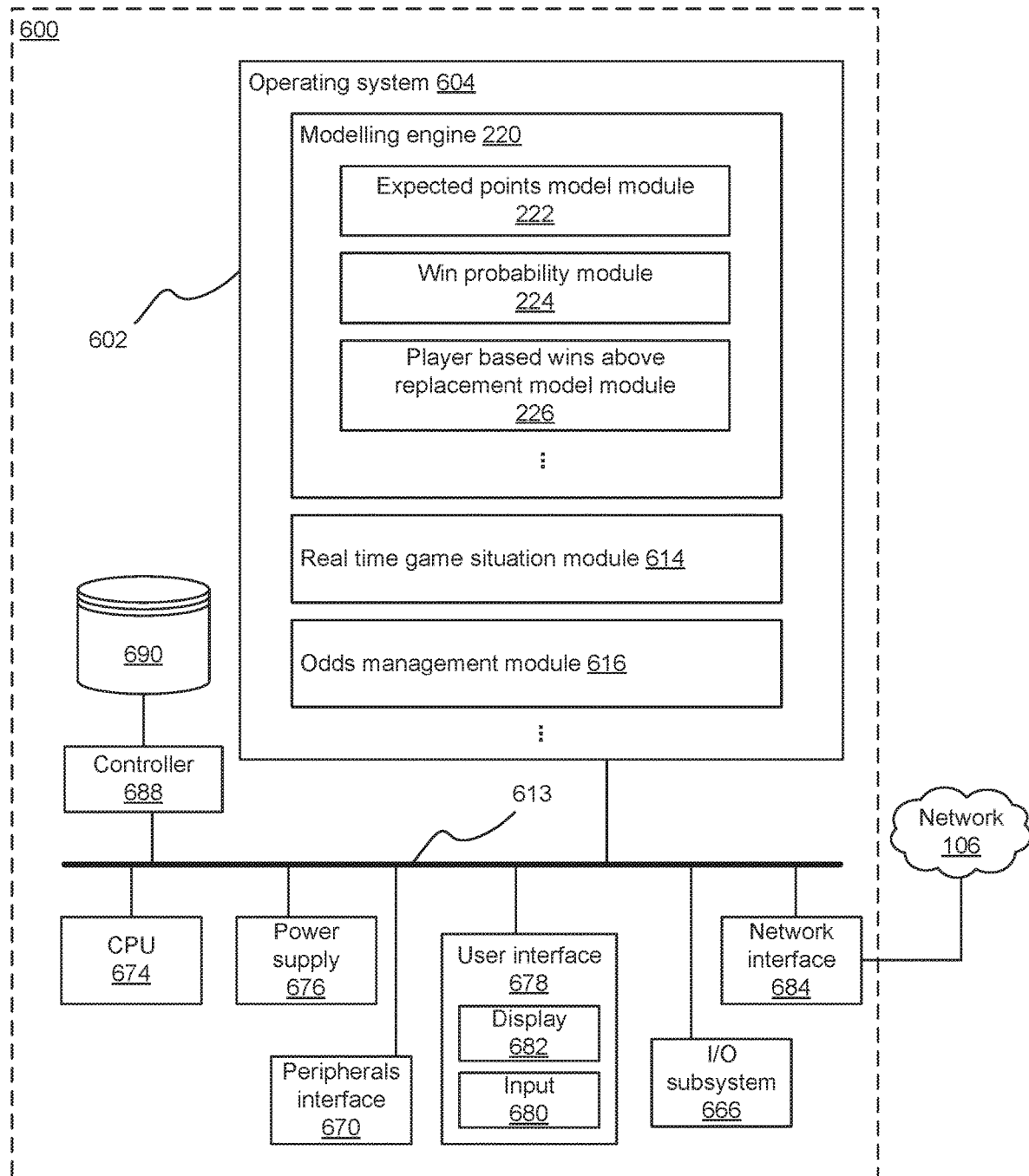
FIG. 6 is a block diagram illustrating an embodiment of an odds management system.

FIG. 6 is a block diagram illustrating an embodiment of an odds management system. Odds management system 600 stores and determines various odds in accordance with the present disclosure. The odds management system 600 includes one or more processing units (CPUs) 674, peripherals interface 670, memory controller 688, a network or other communications interface 684, a memory 602 (e.g., random access memory), a user interface 678, the user interface 678 including a display 682 and an input 680 (e.g., a keyboard, a keypad, a touch screen, etc.), input/output (I/O) subsystem 666, one or more communication busses 613 for interconnecting the aforementioned components, and a power supply system 676 for powering the aforementioned components.

In some embodiments, the input 680 is a touch-sensitive display, such as a touch-sensitive surface. In some embodiments, the user interface 778 includes one or more soft keyboard embodiments. The soft keyboard embodiments may include standard (QWERTY) and/or non-standard configurations of symbols on the displayed icons.

It should be appreciated that odds management system 600 is only one example of a system that may be used in staring and determining various statistics, and that the odds management system 600 optionally has more or fewer components than shown, optionally combines two or more components, or optionally has a different configuration or arrangement of the components. The various components shown in FIG. 6 are implemented in hardware, software, firmware, or a combination thereof, including one or more signal processing and/or application specific integrated circuits.

Memory 602 optionally includes high-speed random access memory and optionally also includes non-volatile memory, such as one or more magnetic disk storage devices, flash memory devices, or other non-volatile solid-state memory devices. Access to memory 602 by other components of the odds management system 600, such as CPU(s) 674 is, optionally, controlled by memory controller 688.

Peripherals interface 670 can be used to couple input and output peripherals of the management system to CPU(s) 674 and memory 602. The one or more processors 674 run or execute various software programs and/or sets of instructions stored in memory 602 to perform various functions for the odds management system 600 and to process data.

In some embodiments, peripherals interface 670, CPU(s) 674, and memory controller 688 are, optionally, implemented on a single chip. In some other embodiments, they are, optionally, implemented on separate chips.

In some embodiments, power system 676 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 6, memory 602 of the remote user device preferably stores:
- an operating system 604 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;
- a modelling engine 200 for storing one or more prediction or outcome models, the modelling engine including:
  - an expected points model module 222 for determining an expected points value of a scenario in a game,
  - a win probability model 224 for determining a probably of winning a game, and
  - a player based wins above replacement model module 226 for determining;
  - a real time game situation module 614 for receiving and communicating information related to a game currently being conducted; and
  - an odds management module 616 for facilitation management of various odds and betting systems.

As previously described, the modelling engine 200 includes various algorithms and models utilized for generating statistics and predicting outcomes at a sports event. In some embodiments, these models include the expected points model 222 that provides a numerical value for each play of a game. For instance, if a drive in a game that results in a touchdown has plays that include a 5-yard rush, a 94-yard pass, and a 1-yard rush, even though the 1-yard rush resulted in the touchdown the 94-yard pass has a much more significant role in the drive. Thus, in some embodiments the 5-yard rush is allocated an expected points value of 0.5, the 94-yard pass is allocated an expected points value of 5.5, and the 1-yard rush is allocated an expected points value of 1, with high values indicating more important or game defining plays. In some embodiments modelling engine 200 uses the telemetry data collected in accordance with the present disclosure to predict the outcome of a game (e.g., win/loss, point spread, etc.) as disclosed with respect to methods and features described with respect to FIG. 8.

In some embodiments, the real time game situation module 614 receives information related to situations occurring in a game. This information is then utilized in adjusting various weights and values in the above described models. For instance, if a quarterback rolls his ankle and has to take every play from a shotgun position, this immobility of the quarterback will be reflected in the game models 220 through the real time game situation module 614.

Figure 7:
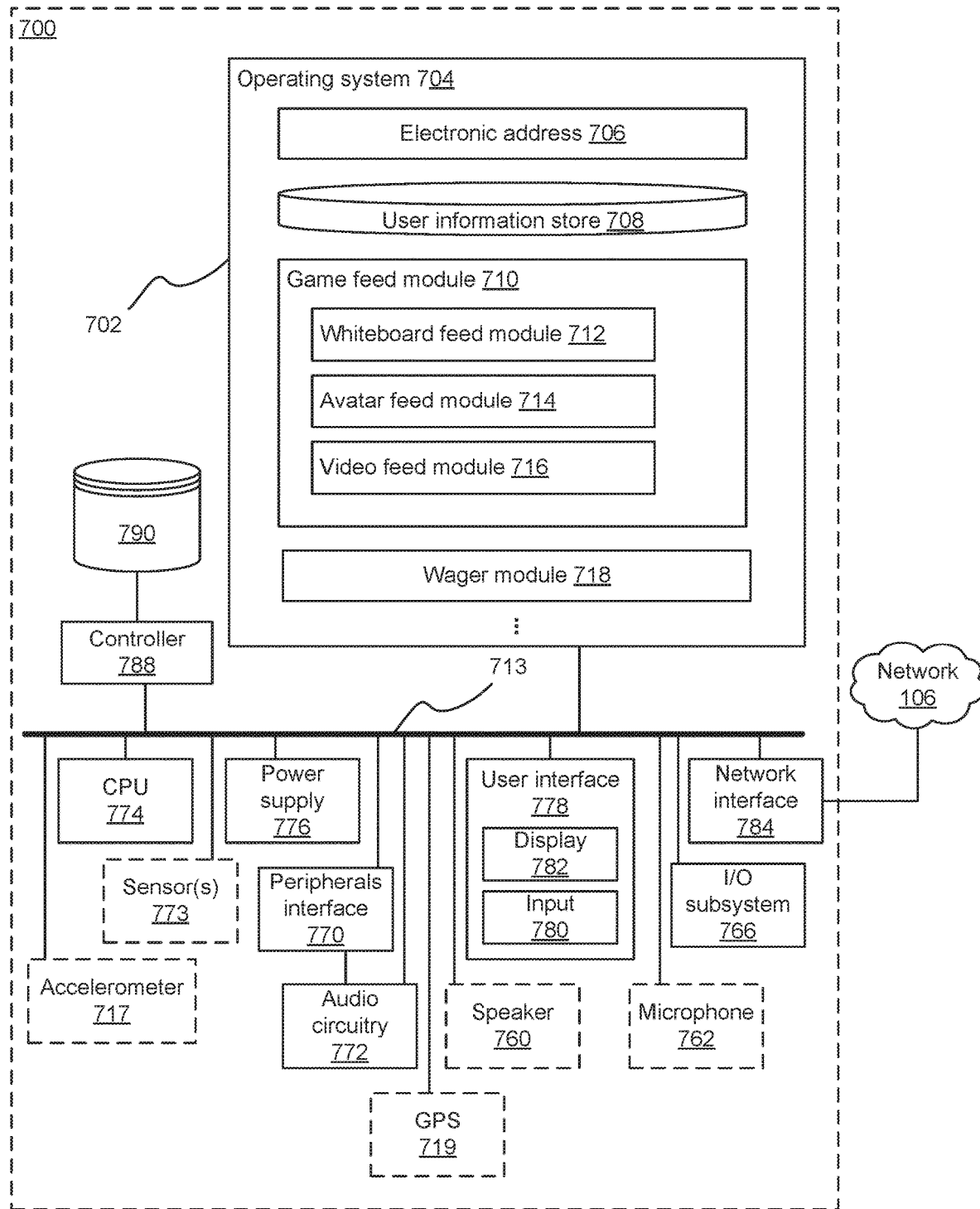
FIG. 7 is a block diagram illustrating an embodiment of a user device.

FIG. 7 is a block diagram illustrating an embodiment of a user device. User device is a remote user device 700 associated with an end user in accordance with the present disclosure. The user device 700 includes one or more processing units (CPUs) 774, peripherals interface 770, memory controller 788, a network or other communications interface 784, a memory 702 (e.g., random access memory), a user interface 778, the user interface 778 including a display 782 and an input 780 (e.g., a keyboard, a keypad, a touch screen, etc.), input/output (I/O) subsystem 766, an optional accelerometer 717, an optional GPS 719, optional audio circuitry 772, an optional speaker 760, an optional microphone 762, one or more optional sensors 764 such as for detecting intensity of contacts on the user device 700 (e.g., a touch-sensitive surface such as a touch-sensitive display system of the device 700) and/or an optical sensor, one or more communication busses 713 for interconnecting the aforementioned components, and a power supply system 776 for powering the aforementioned components.

In some embodiments, the input 780 is a touch-sensitive display, such as a touch-sensitive surface. In some embodiments, the user interface 778 includes one or more soft keyboard embodiments. The soft keyboard embodiments may include standard (QWERTY) and/or non-standard configurations of symbols on the displayed icons.

It should be appreciated that the user device 700 is only one example of a device of a multifunction device that may be used by end users, and that the user device 700 optionally has more or fewer components than shown, optionally combines two or more components, or optionally has a different configuration or arrangement of the components. The various components shown in FIG. 7 are implemented in hardware, software, firmware, or a combination thereof, including one or more signal processing and/or application specific integrated circuits.

Memory 702 optionally includes high-speed random access memory and optionally also includes non-volatile memory, such as one or more magnetic disk storage devices, flash memory devices, or other non-volatile solid-state memory devices. Access to memory 702 by other components of the user device 700, such as CPU(s) 774 is, optionally, controlled by memory controller 788.

Peripherals interface 770 can be used to couple input and output peripherals of the management system to CPU(s) 774 and memory 702. The one or more processors 774 run or execute various software programs and/or sets of instructions stored in memory 702 to perform various functions for the user device 700 and to process data.

In some embodiments, peripherals interface 770, CPU(s) 774, and memory controller 788 are, optionally, implemented on a single chip. In some other embodiments, they are, optionally, implemented on separate chips.

In some embodiments, audio circuitry 772, speaker 760, and microphone 762 provide an audio interface between a user and the device 700. The audio circuitry 772 receives audio data from peripherals interface 770, converts the audio data to an electrical signal, and transmits the electrical signal to speaker 760. Speaker 760 converts the electrical signal to human-audible sound waves. Audio circuitry 772 also receives electrical signals converted by microphone 762 from sound waves. Audio circuitry 772 converts the electrical signal to audio data and transmits the audio data to peripherals interface 770 for processing. Audio data is, optionally, retrieved from and/or transmitted to memory 702 and/or RF circuitry 784 by peripherals interface 770.

In some embodiments, power system 776 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 7, memory 702 of the remote user device preferably stores:

- an operating system 704 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;
- an electronic address 706 that is used to identify a particular user device during communications with various systems and devices of the present disclosure;
- a user information store 708 that stores pertaining information related to the respective user associated with the corresponding user device 700, such as user access information including usernames, user passwords, access tokens, etc.;
- a game feed module 710 for viewing various representations of a game including a whiteboard feed module 712, an avatar feed module 714, and a video feed module 716 as well as viewing various statistics related to the game; and
- a wager module 718 that facilitates placing wagers on game scenarios.

Figure 8:
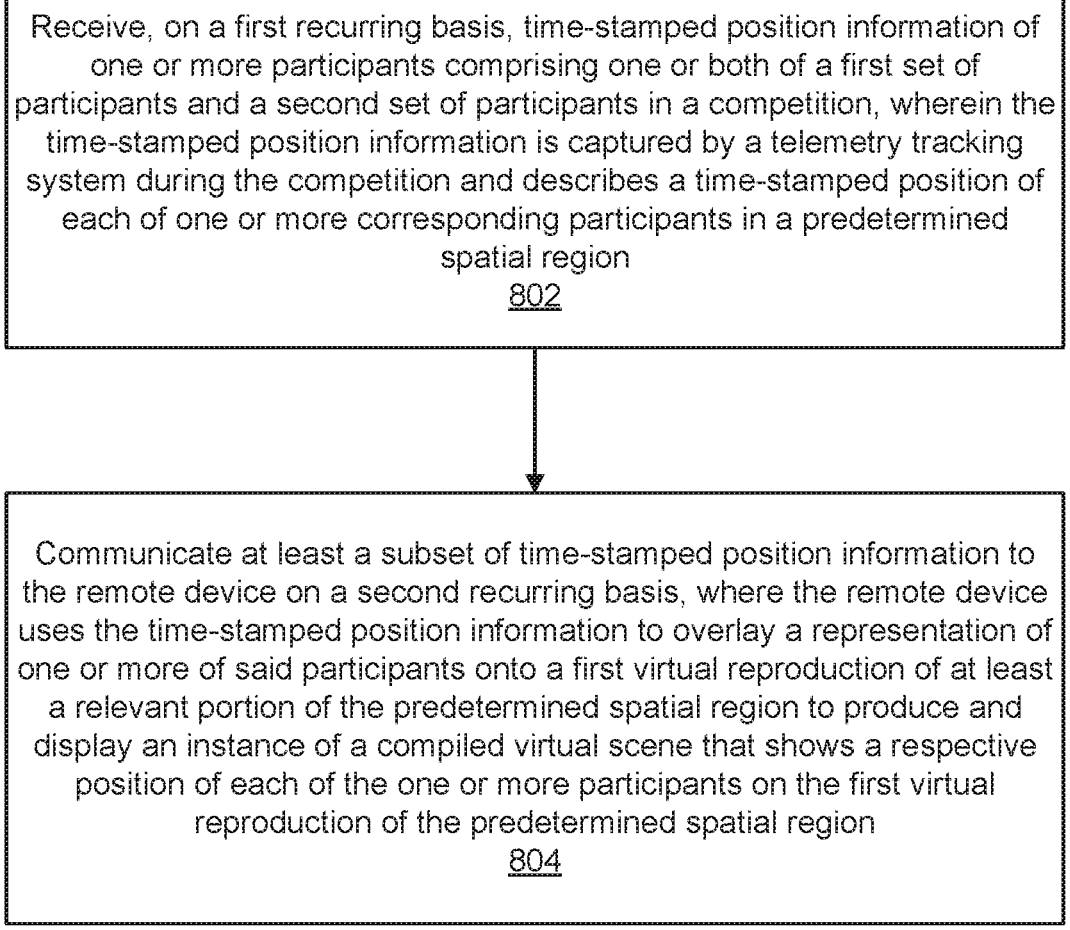
FIG. 8 is a flow chart illustrating an embodiment of a process to provide a real-time representation of positional information of subjects.

In some embodiments wager module 718 uses the telemetry data collected in accordance with the present disclosure to predict the outcome of a current game using extended covariants (e.g., win/loss, point spread, etc.), as disclosed with respect to methods and features described with respect to FIG. 8. In some embodiments, wager module 718 uses the telemetry data collected in accordance with the present disclosure to provide odds for future game events in a current live game.

Now that a general topology of the system 48 has been described, methods for providing a real-time representation of positional information of subjects will be described with reference to, at least, FIGS. 1 through 7.

FIG. 8 is a flow chart illustrating an embodiment of a process to provide a real-time representation of positional information of subjects. This process may be implemented by processor 100 in cooperation with user device 700 and the other devices of system 48 described above.

At 802, process 800 receives, on a first recurring basis, time-stamped position information of one or more participants comprising one or both of a first set of participants and a second set of participants in a competition. The time-stamped position information is captured by a telemetry tracking system during the competition and describes a time-stamped position of each of one or more corresponding participants in a predetermined spatial region.

The time-stamped position data (e.g., telemetry data 230 of FIG. 2) can be from each tracking device 300. Transmissions are received from one or more tracking devices 300 that is associated uniquely with one or more of a participants of a competition (e.g., players in a live sports event), a coach of the live sports event, a referee of the live sports event, a piece of equipment of the live sports event (e.g., a ball, a racquet, etc.), or a combination thereof (e.g., a subject). For instance, in some embodiments the transmissions are received from one or more groups of tracking devices 307, such as a group of tracking devices 307-1 associated with each player currently on the field of play in the sports event, a group of tracking devices 307-2 associated with each referee on the field of play in the sports event, a group of tracking devices 307-3 associated with each a predetermined proximity of a ball on the field of play in the sports event, etc. In some embodiments, the subjects associated with the tracking devices 300 includes a first team (e.g., a home team) and a second team (e.g., a visiting, or away, team) in a variety of teams. In some embodiments, the variety of teams form a league of teams or an association of teams (e.g., a football league, a basketball association, a soccer league, etc.). The first team includes a grouping of players and the second team includes a second grouping of players (e.g., groupings of players associated with respective team). Furthermore, in some embodiments the first team and the second team are engaged in a present game (e.g., a football game, a soccer game, etc.) throughout the methods of the present disclosure (e.g., the receiving the transmission of positional information, a communicating to a remote device, a displaying on the remote device, etc.).

In some embodiments, the transmission occurs on a first recurring basis for each (e.g., instantaneous ping rate 310 of FIG. 3) tracking device 300 as described above. For instance, in some embodiments the first recurring basis is a ping rate (e.g., instantaneous ping rate 310 of FIG. 3) of each tracking device 300. However, the present disclosure is not limited thereto. For instance, the first recurring basis can be a period of time required for the transmissions from the tracking devices 300 to be received by one or more anchor devices 120 and/or communicated therefrom (e.g., to a telemetry data parsing system 240, a machine learning engine 210, etc.). By way of non-limiting example, the first recurring basis occurs on a first periodic basis of between around 20 milliseconds to 150 milliseconds (such as 20 milliseconds, 30 milliseconds, 40 milliseconds, . . . , 140 milliseconds, 150 milliseconds).

Further, each transmission from a respective tracking device 300 includes time-stamped positional information (e.g., telemetry data 230). In some embodiments, the positional information is provided in at least two orthogonal axes (e.g., an X axis coordinate and a Y axis coordinate, a roll and a yaw, etc.), at least three orthogonal axes (e.g., an X axis coordinate, a Y axis coordinate, and a Z axis coordinate; a roll, a pitch, and a yaw, etc.), or at least two orthogonal axes and a measurement of a rate of change (e.g., a velocity, an acceleration, etc.) associated the subject of the respective tracking device 300.

Depending on the tracking device, the XYZ-coordinate may have varying accuracy. The process can be calibrated based on expected accuracy. Accuracy may range from ±2.5 centimeters to ±20 centimeters (such as ±2.5 centimeters, ±5 centimeters, ±7.5 centimeters, . . . , ±20 centimeters).

Each tracking device 300 is configured to send a unique signal that identifies the respective tracking device (e.g. a tracking ID 306 of FIG. 3). In some embodiments, the respective tracking device 300 sends biometric data (e.g. biometric telemetry data 236 of FIG. 2) specific to a respective subject (e.g., player) associated with the respective tracking device instead of the above identifying (e.g., a first transmission of biometric data and a second transmission of positional information) or in combination with the identifying.

The time-stamped positional information and/or the above-described biometric data may include a world clock time-stamp (e.g., a local time of the sports event), a game clock time-stamp (e.g., a current time in a situational clock of the sports event such as a shot clock, a play clock, etc.), or a combination thereof. Each data point of the positional information is timestamped in various embodiments. Accordingly, the transmission of positional information includes a transmission for each respective timestamp (e.g., each second) or a period of time stamps (e.g., each time stamp during a period of time of about 50 ms, about 500 ms, about 1000 ms).

In various embodiments, the predetermined spatial region is a sports field (is a field at which the present game is being played), such as a football field (e.g., field 902), a soccer field, a tennis court, a pool, etc. The predetermined spatial region can be a region that includes a field of play and nearby out of boundary region (e.g., region 904 of FIG. 9). In some embodiments, the predetermined spatial region is a region that is captured by three or more anchor devices 120. Further, in some embodiments the predetermined spatial region is a region that is captured by one or more cameras 140 as further described with respect to FIG. 9.

At 804, the process communicates at least a subset of time-stamped position information to the remote device on a second recurring basis. The respective time-stamped positional information is communicated from a system including processor 100 to a remote device (e.g., a handheld device such as user device 700 of FIG. 7) or from a respective subset of tracking devices 300 in the plurality tracking devices to the remote device.

Each recurrence (or group of recurrences) of communication may correspond to a different instance. The subset of time-stamped positions may correspond to the same players between instances. The subset of time-stamped positions may correspond to the same players between instances may correspond to different players. For example, the corresponding subset of subjects of the second instance of the communicating includes a subject in the plurality of subjects that is not in the corresponding subset of subjects of the first instance of the communicating (e.g., a difference of one or more subjects associated with a respective tracking device 300 compared to a first instance of the communicating).

The second recurring basis can occur at various periods such as, without limitation, between about 50 milliseconds and 1000 milliseconds (e.g., less than one second). For example, the second recurring basis occurs on a second periodic basis of about 50 milliseconds, 100 milliseconds, 150 milliseconds, . . . 1000 milliseconds.

Since the positional data is a relatively small size (e.g., as compared to a high resolution image or video feed) the data can be received and communicated in a short period of time.

In some embodiments, each instance of the receiving and the communicating is collectively conducted within about 100 milliseconds and 1500 milliseconds (e.g., less than 1.5 seconds). For example, each instance of the receiving and the communicating is collectively conducted within about 150 milliseconds, 200 milliseconds, 250 milliseconds, . . . , 1500 milliseconds.

Processor 100 sends the time-stamped position information to the remote device (e.g., user device 700), which uses the information to overlay a representation of one or more of said participants onto a first virtual reproduction of at least a relevant portion of the predetermined spatial region to produce and display an instance of a compiled virtual scene that shows a respective position of each of the one or more participants on the first virtual reproduction of the predetermined spatial region.

The virtual reproduction can have various visual and functional aspects and may be adapted to the remote device. The virtual representation can be optimized for the characteristics of the remote device such as the capabilities of the device to display color or the display size of the device. By way of non-limiting example, the virtual representation is a black and white representation of the sports field, is limited to a few tones of color (e.g., (i) green and white or (ii) green, yellow, and white).

The virtual reproduction of the predetermined spatial region is a representation of the predetermined spatial region (e.g., the area captured by the three or more anchor devices 120) and includes at least a portion of the predetermined spatial region. A variety of views simulating camera angles may be displayed including, without limitation, a bird's eye view or a wide angle view of the predetermined spatial region.

In various embodiments, the process receives a selection of a second virtual reproduction of the predetermined spatial region and in response determines another subset of time-stamped position information and communicates the other subset of time-stamped position information to the remote device. The remote device is configured to produce and display a new instance of a compiled virtual scene that details the relative positional information including a relative position of each of the one or more participants on the second virtual reproduction. Different virtual reproductions may be different views. For example, a second virtual reproduction is a bird's eye view or a wide angle view of the predetermined spatial region other than the first virtual reproduction.

The subset of time-stamped position information communicated on a second recurring basis is associated with a start and/or end of an epic. An epic is a temporally discrete segment of competition. In various embodiments, at each instance of the communication, the time-stamped positional information for a respective epic in a plurality of epics is overlaid onto a first virtual reproduction of the predetermined spatial region (e.g., examples of virtual reproductions are shown in FIGS. 9-13).

In some embodiments, a respective epic includes a play or a down in a game, such as a down in a football game or a play in a soccer game. In some embodiments, a respective epic includes a regulation period of time in a game (e.g., a shot clock, a game clock, a quarter clock, a half clock, a time out clock, etc.). For instance, a respective epic is a period of time on the order of seconds (e.g., 25 seconds to 40 seconds) or minutes (e.g., 40 minutes to 120 minutes). As another example, a respective epic includes a possession (e.g., of a ball) by a team and/or a player in game. As yet another example, a respective epic includes an entire game.

In some embodiments, the time-stamped positional information for a respective epic in the plurality of epics is overlaid onto the virtual reproduction of the predetermined spatial region. This overlaying produces the instance of a compiled virtual scene on the computer system. Accordingly, the compiled virtual scene is transmitted to the remote device. Furthermore, in some embodiments, the time-stamped positional information for a respective epic in the plurality of epics is overlaid onto the virtual reproduction of the predetermined spatial region. This overlaying produces the instance of a compiled virtual scene on the remote device.

In some embodiments, the overlaying further includes utilizing an avatar to represent the position of each subject in the subset of subjects. For instance, in some embodiments the avatar that represents the position of each subject is a graphical representation of an "X" and/or an "O". The avatar that represents the position of each subject is a characterization of a sports player (e.g., an exaggeration of a football player, a cartoon of a football player, or a helmet of a football player). Further, in some embodiments the avatar that represents the position of each subject is a graphical representation of the respective subject. Preferably, the avatar is a model that does not consume a large amount of data in order to allow the receiving and the communicating to occurring in a short period of time.

In some embodiments, the relative positional information across instances of the communicating includes a time-stamped position for each player of the first and second plurality of players in the form of an independent plurality of time-stamped positions for each respective player in the first and second plurality of players.

In some embodiments, each time-stamped position in the independent plurality of time-stamped positions for a respective player of the first or second plurality of players includes an xyz-coordinate of the respective player with respect to a predefined space.

Since the remote device 700 receives a virtual reproduction of the predetermined spatial region, instead of, for instance, a high resolution video stream, an amount of data communicated to the remote device is small, enabling fast communication times (e.g., less than a second since telemetry data 230 is captured). Allowing for the positional information to be communicated to the remote device in this relatively short period of time allows for an end user of the remote device to receive information of the live sports event almost as soon as the event unfolds. This enables the user of the remote device 700 to experience the live sports event with a significantly reduced latency as compared to an end user that experiences the live sports event using a cable television or a conventional high resolution video stream.

The overlaying produces an instance of a compiled virtual scene that details the relative positional information from the respective subset of tracking devices on the first virtual reproduction of the predetermined spatial region. The respective subset of tracking devices is worn by a respective subset of subjects in the plurality of subjects. Accordingly, the method further comprises displaying at the remote device the respective compiled virtual scene from each instance of the communicating. Thus, positional information is tracked and displayed on the remote device.

In some embodiments, the receiving of the positional information, the communicating the positional information, and the displaying the virtual reproduction as described above occurs during a live game (e.g., live sports event) in which the subjects are participating.

In some embodiments, each instance of the communicating the respective time-stamped positional information includes an aggregation of each respective Ultra-Wide Band transmission of time-stamped positional information of one or more corresponding instances of the receiving. The communications between a system (e.g., processor 100) and the remote device (e.g., user device 700) can be by any protocol suitable for the tracking devices. Protocols may vary from sport to sport. One example is using Ultra-Wide Band transmission (e.g., telemetry data 230 of FIG. 2) from each tracking device 300. By way of non-limiting example, an Ultra-Wide Band transmission has a bandwidth of greater than 500 MHz or a fractional bandwidth equal to or greater than 0.20, within 3.5 GHz to 10.7 GHz, or within 3.4 GHz to 10.6 GHz.

As described with respect to FIG. 3, each tracking device 300 transmits positional information (e.g., telemetry data 230 of FIG. 2 and further described below) that describes a time-stamped position of the corresponding subject in a predetermined spatial region. Each tracking device 300 is worn by a corresponding subject (e.g., a player, a coach, a referee, a piece of equipment, etc.) in a plurality of subjects participating in a competitive sport. Any number of tracking devices (at least two, three, four, etc.) may be worn by a respective subject. The tracking devices may be worn in a variety of location including, without limitation, on each limb of the respective subject or on each major muscle group (e.g., core, chest, shoulders, upper back, lower back, etc.) of the respective subject. Additional tracking devices 300 disposed on a respective subject allows for an increase in the number of data points (e.g., telemetry data 230) associated with the subject that are received by the system 48. In some embodiments, the data points for each respective subject is combined to form a more accurate prediction of an actual location of the subject (e.g., triangulation). Furthermore, additional tracking devices 300 disposed on the respective subject allows for rotational data (e.g., a velocity vector) and information to be derived from the positional information received from each tracking device disposed on the respective subject.

By way of non-limiting example, each tracking device 300 has a signal refresh rate of between 1 Hz and 60 Hz and the recurring basis (e.g., the first recurring basis) is between 1 Hz and 60 Hz; each tracking device 300 has a signal refresh rate of about 10 Hz and the recurring basis (e.g., the first recurring basis) is about 10 Hz; each tracking device 300 has a signal refresh rate of about 15 Hz and the recurring basis (e.g., the first recurring basis) is about 15 Hz; or each tracking device 300 has a signal refresh rate of about 20 Hz and the recurring basis (e.g., the first recurring basis) is about 20 Hz.

Figure 9:
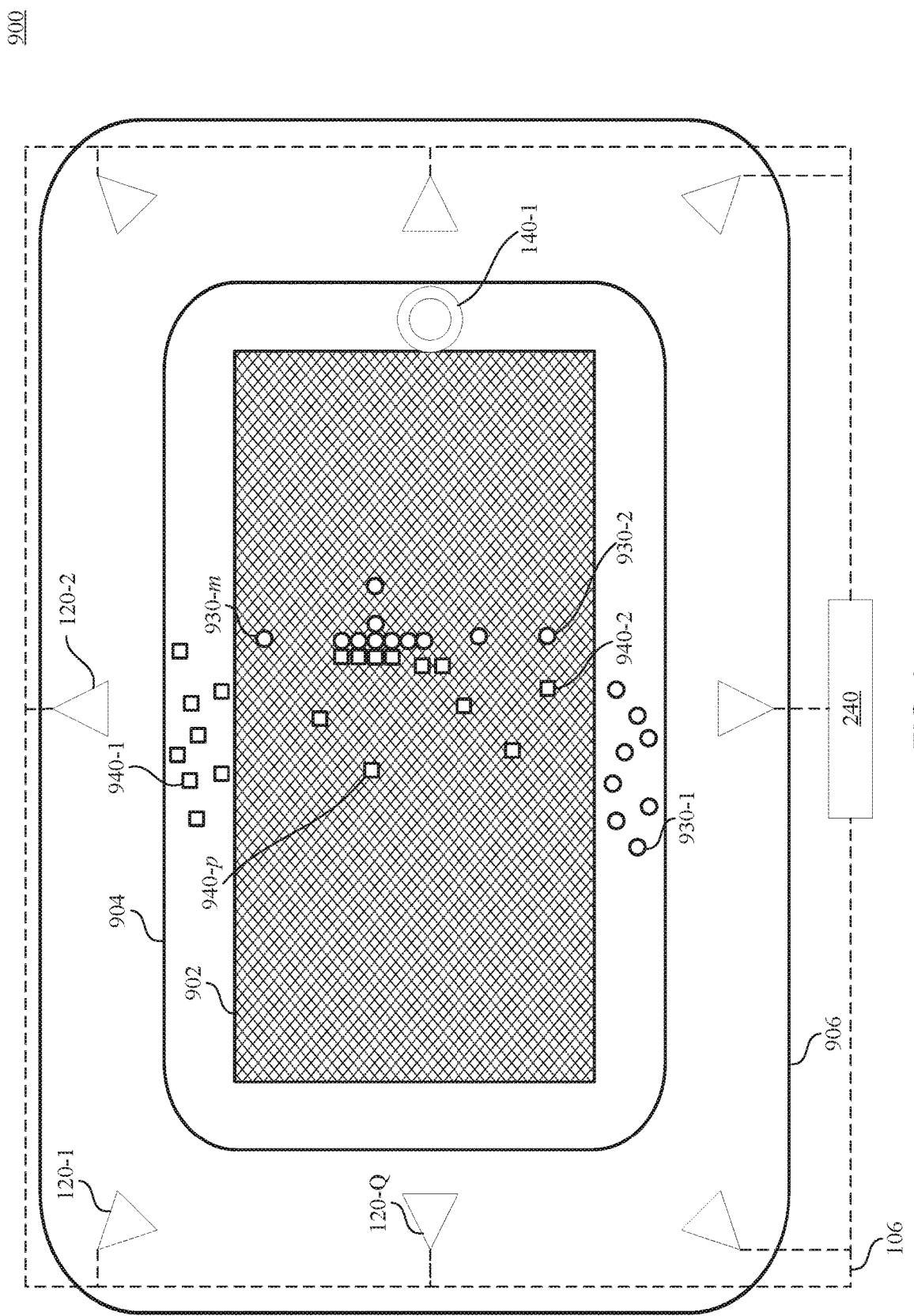
FIG. 9 shows an example of a virtual reproduction including a field of play and components of a tracking system according to an embodiment of the present disclosure.

FIG. 9 shows an example of a virtual reproduction including a field of play and components of a tracking system according to an embodiment of the present disclosure. An exemplary environment (e.g., stadium 906) 900. The environment 900 includes a field of play 902 in which a game is played (e.g., a football game). The environment 900 includes a region 904 that includes the field of play 902 and an area immediately surrounding the field of play (e.g., an area that includes subjects not participating in the game such as subject 930-1 and subject 940-1). The environment 900 includes an array of anchor devices 120 (e.g., anchor device 1201-1, anchor device 120-2, . . . , anchor device 120-Q) that receive telemetry data from one or more tracking devices 300 associated with a respective subject of the game. As illustrated in FIG. 9, in some embodiments the array of anchor devices is in communication (e.g., via communication network 106) with a telemetry parsing system 240 (e.g., tracker management system 400 of FIG. 4). Moreover, in some embodiments one or more cameras 140 (e.g., camera 140-1) capture images and/or video of the sports event, which is used in forming the virtual reproduction. In FIG. 9, markers 930 represent subjects a first team of the game while markers 940 represents subjects of a second team of the game.

Figure 10:
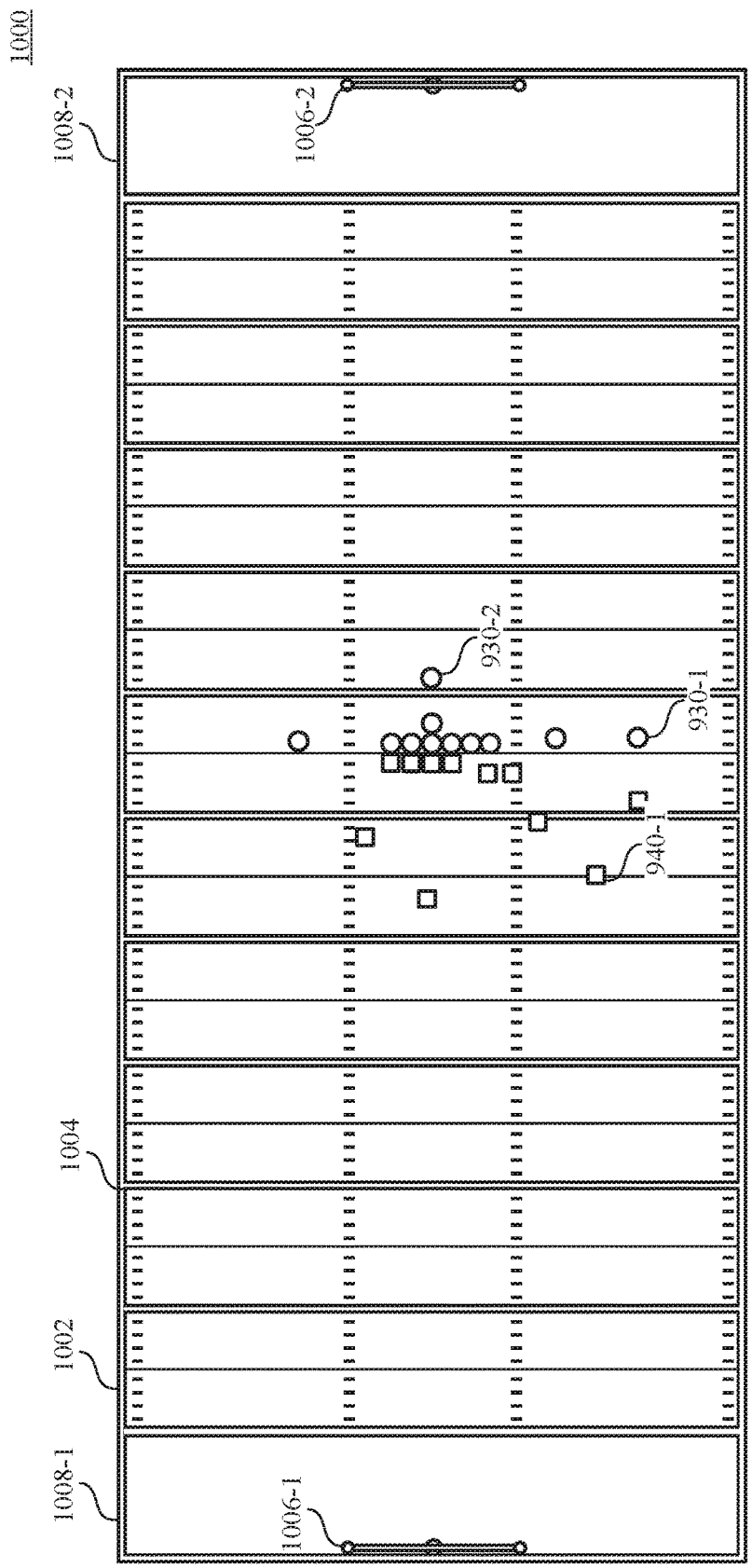
FIG. 10 shows an example of a virtual reproduction including a field of play according to an embodiment of the present disclosure.

FIG. 10 shows an example of a virtual reproduction including a field of play according to an embodiment of the present disclosure. An exemplary virtual reproduction 1000 is illustrated. This virtual reproduction 1000 is a two tone reproduction of a field of play 1002. In some embodiments, the virtual reproduction includes regulation lines 1004, such as yard lines of a football game, penalty boxes of a soccer game, etc. In some embodiments, the virtual reproduction includes a field goal post 1006 and/or an end zone 1008 for one or more sides of the field of the play. Furthermore, in some embodiments the virtual reproduction includes a graphic or logo on the field of play (e.g., a mid-field logo).

Figure 11:
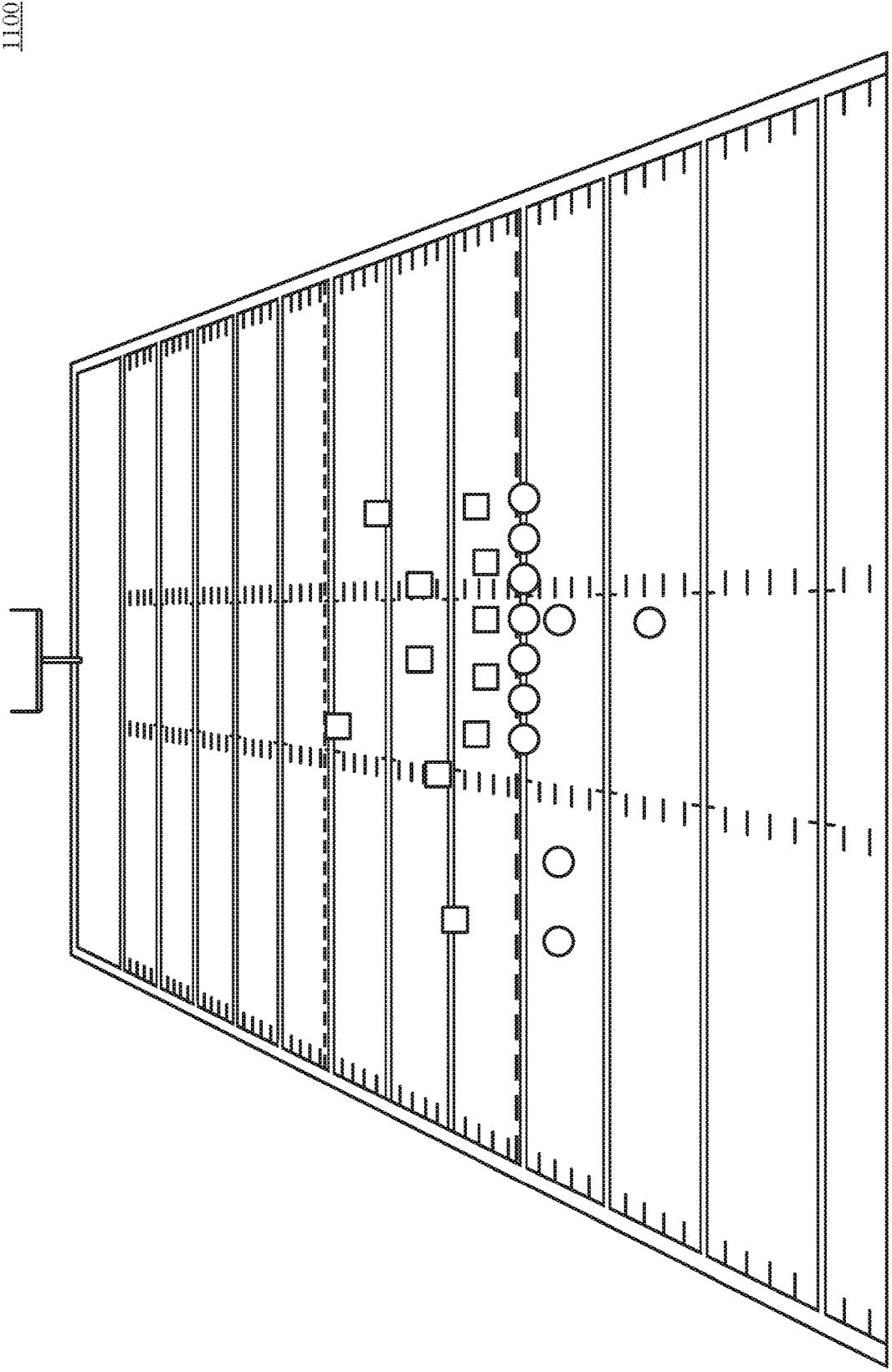
FIG. 11 shows an example of a bird's eye view virtual reproduction including a field of play according to an embodiment of the present disclosure.

FIG. 11 shows an example of a bird's eye view virtual reproduction including a field of play according to an embodiment of the present disclosure. An exemplary virtual reproduction 1100 is illustrated. This virtual reproduction 1100 includes some or all of the above described virtual reproductions (e.g., virtual reproduction 1000 of FIG. 10) but illustrated at different viewing perspective (e.g., birds eye view, wide angle view). For instance, in some embodiments an end user of a remote device 700 is enabled to between one or more virtual reproductions of a game, with each reproduction virtual reproduction having a unique viewing perspective and/or unique level of detail within the virtual reproduction (e.g., a high quality reproduction that includes one or more optional elements such as end zones 1008 and a lower quality reproduction that omits one or more optional elements).

Figure 12:
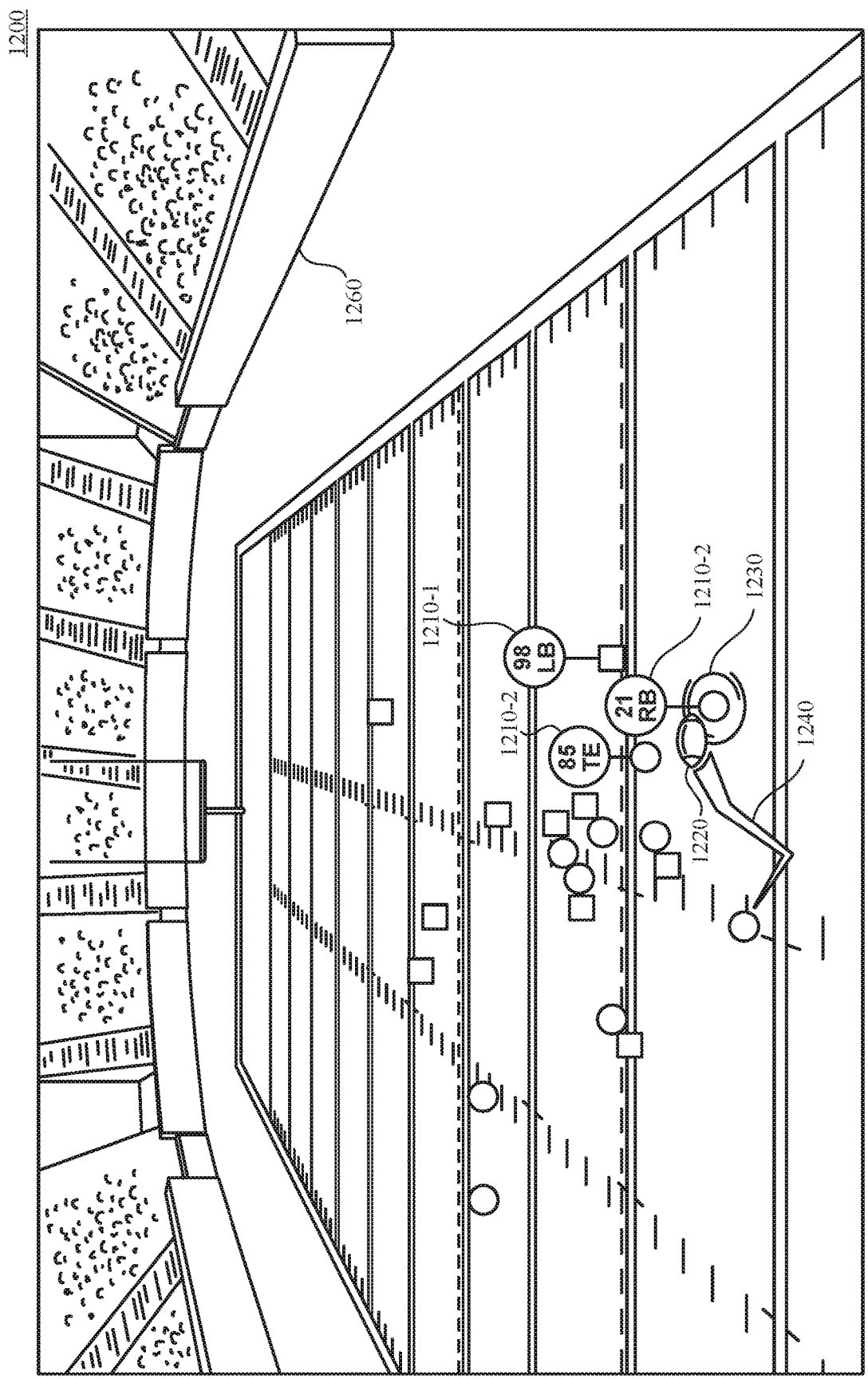
FIG. 12 shows an example of a wide angle view virtual reproduction including field of play according to an embodiment of the present disclosure.

FIG. 12 shows an example of a wide angle view virtual reproduction including field of play according to an embodiment of the present disclosure. An exemplary virtual reproduction 1200 is illustrated. The virtual reproduction includes a first indicator 1230 that identifies a ball carrier in respective epic of the sports event. The virtual reproduction includes a second indicator that identifies a previous ball carrier in respective epic of the sports event. One or more players represented in the virtual reproduction includes a tag 1210. Each respective tag 1210 includes information related to the respective player, such as a position of the player, a number of the player, a distance from the ball to the player etc. Each player that is within a predetermined distance (e.g., two yards, five yards, ten yards, etc.) of the ball is allocated a respective tag 1210. The virtual reproduction includes a graphical representation of the ball 1220. The virtual reproduction includes a path of travel 1240 of the ball. A width of the path of travel reduces as a period of time and/or a distance from a previous player in possession of the ball increases.

In some embodiments, the virtual reproduction includes a graphical representation of the location 1260 in which the sports event is being played (e.g., a stadium). For instance, the graphical representation 1260 is a generic graphical representation (e.g., used for each game independent of a location of the game). Alternatively, the graphical representation 1260 is unique to each home team of the game (e.g., is a graphical representation of the stadium of the home team). The graphical representation 1260 can be a static background (e.g., a still image) or is animated (e.g., a .gif file).

Figure 13:
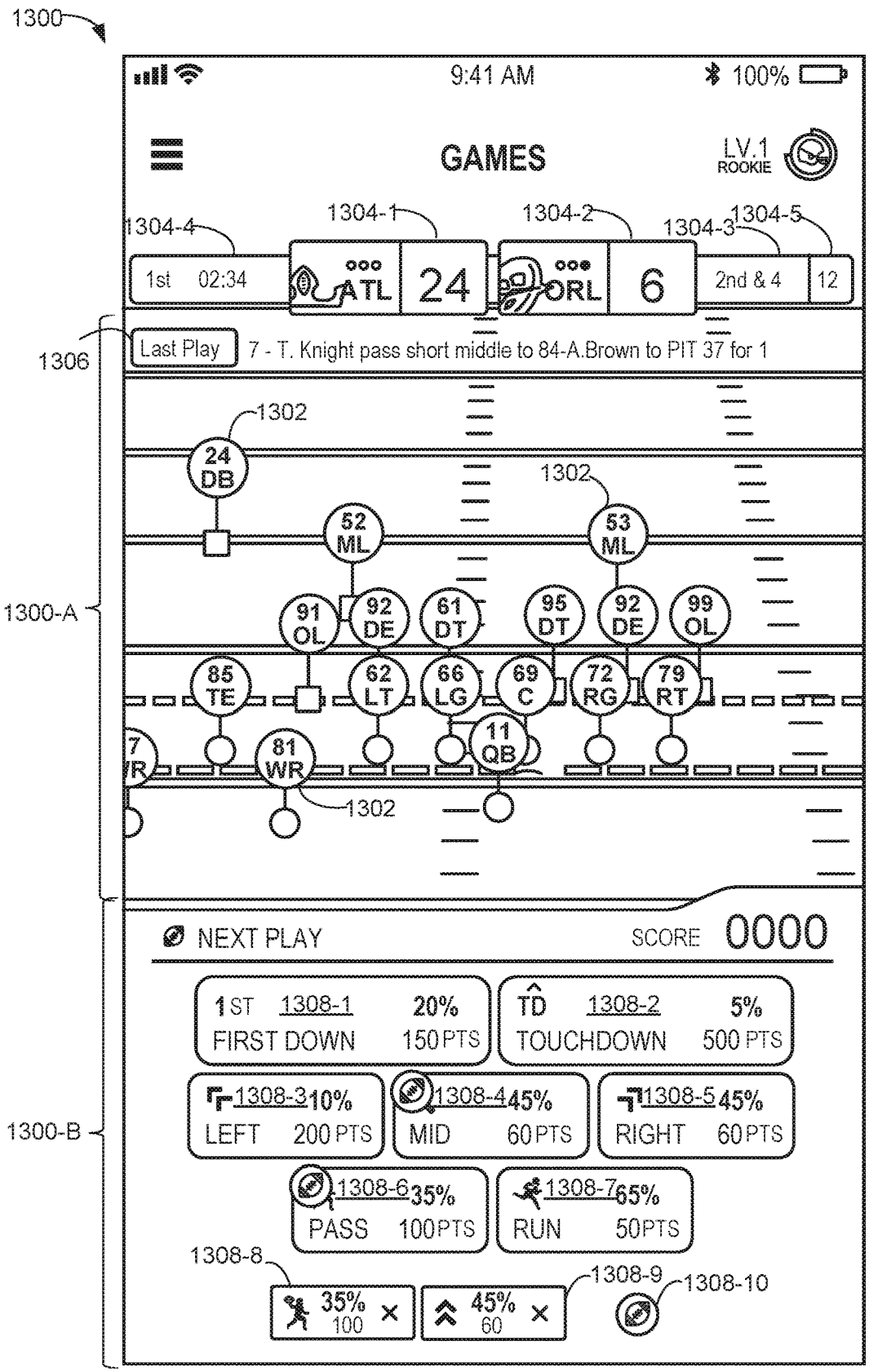
FIG. 13 shows an example of a graphical user interface including a virtual reproduction and field of play running on a remote user device according to an embodiment of the present disclosure.

FIG. 13 shows an example of a graphical user interface including a virtual reproduction and field of play running on a remote user device according to an embodiment of the present disclosure. Affordances from 1308-8 to 1308-10 of user interface 1300 are input elements configured to accept a wager from a user. In FIG. 13, the affordance 1308-8 illustrates that a user has provided a first wager on passing the ball and the affordance 1308-9 illustrates that the user has provided a second wager on advancing the ball down the middle. Affordance 1308-10 is an input element configured to accept a third wager corresponding to the result of the next play. In FIG. 13, a user has not provided a third wager on the results of the play (e.g., 1st down or a touchdown), which is indicated by a football icon in affordance 1308-10. User may provide the third wager by selecting a 1st down or a touchdown by user input on affordance 1308-10. The wager is placed while the live sport event is occurring. For example, the user interface 1300 is configured to accept a wager before each play during the live sport event. The payout in the case where the user wager turns out to be the correct wager is determined at least in part on a prediction of a probability of the first future event.

Thus, the present disclosure provides systems and methods for tracking and displaying positional information from various subjects participating, for example, in a game at a live sports event. The positional information is parsed and converted into a virtual reproduction of the game, which includes graphical representations of the subjects and/or the game that consume a limited amount of data. From a point in time in which the positional information is captured to a point in time in which the positional information is displayed on a remote device via the virtual reproduction consumes less than one second, in various embodiments, which allows for an end user of the remote device to experience the game in near real time.

While the present disclosure describes various systems and methods in relation to a gridiron football game, one skilled in the art will recognize that the present disclosure is not limited thereto. The techniques disclosed herein find application in games with a discrete or finite state where a player or team has possession of a ball (e.g., holding the ball) as well as other types of events. For instance, in some embodiments the systems and methods of the present disclosure are applied to events including a baseball game, a basketball game, a cricket game, a football game, a handball game, a hockey game (e.g., ice hockey, field hockey), a kickball game, a Lacrosse game, a rugby game, a soccer game, a softball game, or a volleyball game, auto racing, boxing, cycling, running, swimming, tennis etc., or any such event in which a location of a subject is relevant to an outcome of the event.

The present disclosure addresses the need in the art for improved systems and methods for representing positions of subjects at a competition such as a live sport event. In particular, the present disclosure provides for providing a real-time representation of positional information of subjects. The present disclosure facilitates increased spectators' engagement and interest in the live sport event by providing a real-time representation of positional information of subjects.

With regard to expected points evaluation, multinomial logistic regression, or other types of analysis, can be used for estimating the probabilities of each next event that is possible outcome of a given play situation. The next event is a scoring event or a non-scoring event. The scoring events include a touchdown of a team in possession of the ball (7 points), field goal of a team in possession of the ball (3 points), safety of a team in possession of the ball (2 points), opponent's safety (−2 points), opponent's field goal (−3 points), and opponent's touchdown (−7 points). Non-scoring events (0 points) include events that describe attempts the team in possession of the ball may take. In one instance, the team in possession of the ball may attempt to advance the ball to the left, to the right or down the middle in the next play. In another instance, the team in possession of the ball may attempt to pass the ball or run the ball in the next play.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to track and provide positional information for display on a remote device, the system comprising:
a communication interface configured to receive, on a first recurring basis, time-stamped position information of one or more participants comprising one or both of a first set of participants and a second set of participants in a competition, wherein:
the time-stamped position information is captured by a telemetry tracking system during the competition and describes a time-stamped position of each of one or more corresponding participants during the competition in a predetermined spatial region; and
the first recurring basis is based on a refresh rate of the telemetry tracking system; and
a processor coupled to the communication interface and configured to determine a size or content of a subset of the time-stamped position information that is to be communicated on a second recurring basis, and to communicate the subset of the time-stamped position information to the remote device on the second recurring basis, wherein:
the second recurring basis is based at least in part on a start and/or end of an epic and the subset of the time-stamped information communicated on the second recurring basis is a temporally discrete segment of the competition;
the size or content of the subset of the time-stamped position information that is communicated on the second recurring basis is determined such that the remote device renders produces and displays an associated compiled virtual scene within a threshold time;
the processor is further configured to, contemporaneous with the competition, parse the time-stamped position information and to apply a machine learning process to analyze the time-stamped position information and a context of the competition to obtain situational information pertaining to the competition and statistics pertaining to the competition;
a subset of the situational information pertaining to the competition or the statistics pertaining to the competition is stored in a cache that is used to provide a response to real-time queries of outcomes with respect to the competition, and another subset of the situational information pertaining to the competition or the statistics pertaining to the competition is stored in a database; and
the remote device is configured to:
use the content of the subset of the time-stamped position information to overlay a representation of the one or more participants onto a first virtual reproduction of at least a relevant portion of the predetermined spatial region to produce and display an instance of the associated compiled virtual scene that shows a respective position of each of the one or more corresponding participants on the first virtual reproduction of the predetermined spatial region; and render a user interface including at least one affordance adjacent to the overlay including a plurality of competition aspects on which a wager is placed and associated points based on wager outcome from the subset of the situation information in response to a request from a user of the remote device, wherein: the at least one affordance accepts at least one wager from the user associated with (i) content of the first virtual reproduction and (ii) a time period between the start and the end of the epic; and the associated points are determined based at least in part on a probability of an outcome associated with a corresponding competition aspect of the plurality of competition aspects.

2. The system of claim 1, wherein the first recurring basis includes a first range of frequencies data is sent to the system by tracking devices of the telemetry tracking system.

3. The system of claim 1, wherein the second recurring basis includes a second range of frequencies data is sent to the remote device.

4. The system of claim 1, wherein the competition is a live sport event and the predetermined spatial region is a sports field.

5. The system of claim 1, wherein: the competition is a football game; and
the subset of time-stamped position information communicated on the second recurring basis is associated with a start and/or end of a different play in a live football game.

6. The system of claim 1, wherein the competition is between a first team comprising a first subset of the first set of participants and a second team comprising a second subset of the second set of participants.

7. The system of claim 1, wherein the threshold time is prior to an end of a play in a live sport event.

8. The system of claim 1, wherein the epic represents a period of time of 40 seconds.

9. The system of claim 1, wherein the processor is further configured to receive a selection of a second virtual reproduction of the predetermined spatial region and in response:
determine an other subset of the time-stamped position information; and
communicate the other subset of the time-stamped position information to the remote device, wherein the remote device produces and displays a new instance of a compiled virtual scene that details the time-stamped positional information including a relative position of each of the one or more corresponding participants on the second virtual reproduction.

10. The system of claim 1, wherein the time-stamped position information received on a first recurring basis is an Ultra-Wide Band transmission.

11. The system of claim 1, wherein the telemetry tracking system includes at least one tracking device worn by a corresponding participant.

12. The system of claim 1, wherein the telemetry tracking system includes at least one tracking device worn by a corresponding participant of the one or more participants.

13. The system of claim 1, wherein the positional information is provided on at least two orthogonal axes.

14. The system of claim 1, wherein the first virtual reproduction is a bird's eye view or a wide angle view of the predetermined spatial region.

15. The system of claim 1, wherein the time-stamped position information includes a world clock time-stamp, a game clock time-stamp, or a combination thereof.

16. The system of claim 1, wherein the processor is further configured to use an avatar to represent a relative position of a corresponding participant on the first virtual reproduction of the predetermined spatial region.

17. The system of claim 1, wherein the processor is further configured to compile the associated compiled virtual scene including by aggregating a plurality of instances of time-stamped position information.

18. The system of claim 1, wherein the associated points are determined prior to conclusion of an associated play.

19. The system of claim 1, wherein time-stamped position information is received for the one or more participants corresponding to an active participant is received at higher frequency than time-stamped position information for one or more participants corresponding to a non-active participant.

20. The system of claim 19, wherein the active participant corresponds to a participant on a field or court of play, and the non-active participant corresponds to a participant that is not on the field or court of play.

21. The system of claim 1, wherein the situational information pertaining to the competition includes formational information for a set of participants.

22. The system of claim 21, wherein the statistics pertaining to the competition includes a probability of an outcome that is based at least in part on the formational information for the set of participants.

23. The system of claim 1, wherein the processor determines the subset of the situational information pertaining to the competition or the statistics pertaining to the competition to store in the cache based at least in part on the time-stamped position information.

24. A method to track and provide positional information for display on a remote device, the method comprising:
receiving, on a first recurring basis, time-stamped position information of one or more participants comprising one or both of a first set of participants and a second set of participants in a competition, wherein:
the time-stamped position information is captured by a telemetry tracking system during the competition and describes a time-stamped position of each of one or more corresponding participants during the competition in a predetermined spatial region; and
the first recurring basis is based on a refresh rate of the telemetry tracking system;
parsing time-stamped position information and to applying a machine learning process to analyze the time-stamped position information and a context of the competition to obtain situational information pertaining to the competition and statistics pertaining to the competition, wherein:
the parsing the time-stamped position information and the applying the applying a machine learning process to analyze the time-stamped position information is performed contemporaneous with the competition; and a subset of the situational information pertaining to the competition or the statistics pertaining to the competition is stored in a cache that is used to provide a response to real-time queries of outcomes with respect to the competition, and another subset of the situational information pertaining to the competition or the statistics pertaining to the competition is stored in a database;

determining a size or content of a subset of time-stamped position information that is to be communicated to the remote device on a second recurring basis; and communicating the size or content of the subset of time-stamped position information to the remote device on the second recurring basis, wherein:

the second recurring basis is based at least in part on a start and/or end of an epic and the subset of time-stamped information communicated on the second recurring basis is a temporally discrete segment of competition;

the size or content of the subset of time-stamped position information that is communicated on the second recurring basis is determined such that the remote device renders produces and displays an associated compiled virtual scene within a threshold time; and the remote device is configured to:

use the content of the subset of the time-stamped position information to overlay a representation of the one or more participants onto a first virtual reproduction of at least a relevant portion of the predetermined spatial region to produce and display an instance of the associated compiled virtual scene that shows a respective position of each of the one or more corresponding participants on the first virtual reproduction of the predetermined spatial region; and render a user interface including at least one affordance adjacent to the overlay including a plurality of competition aspects on which a wager is placed and associated points based on wager outcome from the subset of the situation information in response to a request from a user of the remote device, wherein: the at least one affordance accepts at least one wager from the user associated with (i) content of the first virtual reproduction and (ii) a time period between the start and the end of the epic; and the associated points are determined based at least in part on a probability of an outcome associated with a corresponding competition aspect of the plurality of competition aspects.

25. A computer program product embodied in a non-transitory computer readable storage medium and comprising computer instructions for:

receiving, on a first recurring basis, time-stamped position information of one or more participants comprising one or both of a first set of participants and a second set of participants in a competition, wherein:

the time-stamped position information is captured by a telemetry tracking system during the competition and describes a time-stamped position of each of one or more corresponding participants during the competition in a predetermined spatial region; and the first recurring basis is based on a refresh rate of the telemetry tracking system; and parsing time-stamped position information and to applying a machine learning process to analyze the time-stamped position information and a context of the competition to obtain situational information pertaining to the competition and statistics pertaining to the competition, wherein:

the parsing the time-stamped position information and the applying the applying a machine learning process to analyze the time-stamped position information is performed contemporaneous with the competition; and a subset of the situational information pertaining to the competition or the statistics pertaining to the competition is stored in a cache that is used to provide a response to real-time queries of outcomes with respect to the competition, and another subset of the situational information pertaining to the competition or the statistics pertaining to the competition is stored in a database;

determining a size or content of a subset of time-stamped position information that is to be communicated to a remote device on a second recurring basis; and communicating the size or content of the subset of time-stamped position information to the remote device on the second recurring basis, wherein the second recurring basis is based at least in part on a start and/or end of an epic and the subset of time-stamped information communicated on the second recurring basis is a temporally discrete segment of competition; and the size or content of the subset of time-stamped position information that is communicated on the second recurring basis is determined such that the remote device renders produces and displays an associated compiled virtual scene within a threshold time; and the remote device is configured to: use the content of the subset of the time-stamped position information to overlay a representation of the one or more participants onto a first virtual reproduction of at least a relevant portion of the predetermined spatial region to produce and display an instance of the associated compiled virtual scene that shows a respective position of each of the one or more corresponding participants on the first virtual reproduction of the predetermined spatial region; and render a user interface including at least one affordance adjacent to the overlay, including a plurality of competition aspects on which a wager is placed and associated points based on wager outcome from the subset of the situation information in response to a request from a user of the remote device wherein:

the at least one affordance accepts at least one wager from the user associated with (i) content of the first virtual reproduction and (ii) a time period between the start and the end of the epic; and the associated points are determined based at least in part on a probability of an outcome associated with a corresponding competition aspect of the plurality of competition aspects.

* * * * *

UNITED STATES PATENT AND TRADEMARK OFFICE
CERTIFICATE OF CORRECTION

PATENT NO. : 11,305,194 B2
APPLICATION NO. : 16/747437
DATED : April 19, 2022
INVENTOR(S) : Erik Schwartz et al.

Page 1 of 1

It is certified that error appears in the above-identified patent and that said Letters Patent is hereby corrected as shown below:

On the Title Page

In page 2, Column 2, item (56), U.S. Patent documents, cite no. 14, delete "Fei" and insert --Feier--, therefor.

In the Claims

In Column 28, Line(s) 54, Claim 1, after "competition;", insert --and--.

In Column 30, Line(s) 57, Claim 24, before "a machine", delete "the applying".

In Column 32, Line(s) 5, Claim 25, before "a machine", delete "the applying".

Signed and Sealed this
Fourth Day of October, 2022

Katherine Kelly Vidal
*Director of the United States Patent and Trademark Office*